(12) United States Patent
Tang et al.

(10) Patent No.: US 8,934,178 B2
(45) Date of Patent: Jan. 13, 2015

(54) IMAGE CAPTURING OPTICAL LENS SYSTEM

(71) Applicant: Largan Precision Co., Ltd., Taichung (TW)

(72) Inventors: Hsiang-Chi Tang, Taichung (TW); Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 143 days.

(21) Appl. No.: 13/709,073

(22) Filed: Dec. 10, 2012

(65) Prior Publication Data

US 2014/0111876 A1    Apr. 24, 2014

(30) Foreign Application Priority Data

Oct. 22, 2012  (TW) .............................. 101138920 A

(51) Int. Cl.
*G02B 13/18*  (2006.01)
*G02B 9/62*  (2006.01)
*G02B 13/00*  (2006.01)

(52) U.S. Cl.
CPC ............ *G02B 13/0045* (2013.01); *G02B 13/18* (2013.01); *G02B 9/62* (2013.01)
USPC .......................................... 359/713; 359/757

(58) Field of Classification Search
CPC .................................. G02B 9/62; G02B 13/18
USPC ................................................... 359/713, 757
See application file for complete search history.

(56) References Cited

U.S. PATENT DOCUMENTS

2013/0003193 A1    1/2013  Huang
2013/0215520 A1*   8/2013  Lai et al. ........................ 359/713

FOREIGN PATENT DOCUMENTS

| JP | 2011-085733 A | 4/2011 |
| KR | 10-2010-0040357 A | 4/2010 |
| WO | 2013-150755 A1 | 10/2013 |
| WO | 2014-006822 A1 | 1/2014 |

* cited by examiner

*Primary Examiner* — William Choi
(74) *Attorney, Agent, or Firm* — CKC & Partners Co., Ltd.

(57) ABSTRACT

An image capturing optical lens system includes, in order from an object side to an image side, a first lens element, a second lens element, a third lens element, a fourth lens element, a fifth lens element, and a sixth lens element. The first lens element with positive refractive power has a convex object-side surface. The second lens element has negative refractive power. The third lens element has refractive power. The fourth lens element has refractive power, wherein at least one surface of the fourth lens element is aspheric. The fifth lens element with negative refractive power has a concave object-side surface and a convex image-side surface, and the surfaces thereof are aspheric. The sixth lens element with refractive power has an image-side surface changing from concave at a paraxial region thereof to convex at a peripheral region thereof, and the surfaces thereof are aspheric.

33 Claims, 23 Drawing Sheets

IMAGE CAPTURING OPTICAL LENS SYSTEM

RELATED APPLICATIONS

The application claims priority to Taiwan Application Serial Number 101138920, filed Oct. 22, 2012, which is herein incorporated by reference.

BACKGROUND

1. Technical Field

The present invention relates to an image capturing optical lens system. More particularly, the present invention relates to a compact image capturing optical lens system applicable to electronic products.

2. Description of Related Art

In recent years, with the popularity of mobile products with camera functionalities, the demand of optical lens systems is increasing. The sensor of a conventional optical lens system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure or a five-element lens structure such as the one disclosed in U.S. Pat. No. 7,869,142 and the one disclosed in U.S. Pat. No. 8,000,031. Due to the popularity of mobile products with high-end specifications, such as smart phones and PDAs (Personal Digital Assistants), the pixel and image-quality requirements of the compact optical lens system have increased rapidly. However, the conventional four-element lens structure or five-element lens structure cannot satisfy the requirements of the compact optical lens system.

Although there are optical lens systems with six-element lens structure, such as the one disclosed in U.S. Publication No. 2012/0229917. However, the fifth lens element of this optical lens system is not a meniscus with stronger curvature and the peripheral field of view can not be focused on the image plane; therefore, it is not favorable for resolving power and image quality.

SUMMARY

According to one aspect of the present disclosure, an image capturing optical lens system includes, in order from an object side to an image side, a first lens element, a second lens element, a third lens element, a fourth lens element, a fifth lens element, and a sixth lens element. The first lens element with positive refractive power has an object-side surface being convex at a paraxial region thereof. The second lens element has negative refractive power. The third lens element has refractive power. The fourth lens element has refractive power, wherein at least one of an object-side surface and an image-side surface of the fourth lens element is aspheric. The fifth lens element with negative refractive power has an object-side surface being concave and an image-side surface being convex at a paraxial region thereof, wherein the object-side surface and the image-side surface of the fifth lens element are aspheric. The sixth lens element with refractive power has an image-side surface, wherein the image-side surface of the sixth lens element changes from concave at a paraxial region thereof to convex at a peripheral region thereof, and an object-side surface and the image-side surface of the sixth lens element are aspheric. When a curvature radius of the object-side surface of the first lens element is R1, and a curvature radius of an image-side surface of the first lens element is R2, the following relationship is satisfied:

$$-3.0 < (R1+R2)/(R1-R2) < 0.$$

According to another aspect of the present disclosure, an image capturing optical lens system includes, in order from an object side to an image side, a first lens element, a second lens element, a third lens element, a fourth lens element, a fifth lens element, and a sixth lens element. The first lens element with positive refractive power has an object-side surface being convex at a paraxial region thereof. The second lens element with refractive power has an image-side surface being concave at a paraxial region thereof. The third lens element has refractive power. The fourth lens element with refractive power has an image-side surface being convex at a paraxial region thereof, wherein at least one of an object-side surface and the image-side surface of the fourth lens element is aspheric. The fifth lens element with negative refractive power has an object-side surface being concave and an image-side surface being convex at a paraxial region thereof, wherein the object-side surface and the image-side surface of the fifth lens element are aspheric. The sixth lens element with refractive power has an image-side surface, wherein the image-side surface of the sixth lens element changes from concave at a paraxial region thereof to convex at a peripheral region thereof, and an object-side surface and the image-side surface of the sixth lens element are aspheric. When an Abbe number of the fifth lens element is V5, and an Abbe number of the sixth lens element is V6, the following relationship is satisfied:

$$0.20 < V5/V6 < 0.70.$$

According to still another aspect of the present disclosure, an image capturing optical lens system includes, in order from an object side to an image side, a first lens element, a second lens element, a third lens element, a fourth lens element, a fifth lens element, and a sixth lens element. The first lens element with positive refractive power has an object-side surface being convex at a paraxial region thereof. The second lens element with negative refractive power has a concave image-side surface. The third lens element has refractive power. The fourth lens element has refractive power, wherein at least one of an object-side surface and an image-side surface of the fourth lens element is aspheric. The fifth lens element with negative refractive power has an object-side surface being concave and an image-side surface being convex at a paraxial region thereof, wherein the object-side surface and the image-side surface of the fifth lens element are aspheric. The sixth lens element with refractive power has an image-side surface, wherein the image-side surface of the sixth lens element changes from concave at a paraxial region thereof to convex at a peripheral region thereof, and an object-side surface and the image-side surface of the sixth lens element are aspheric. When a focal length of the image capturing optical lens system is f, a focal length of the second lens element is f2, a focal length of the fifth lens element is f5, and a curvature radius of the image-side surface of the sixth lens element is R12, the following relationships are satisfied:

$$-1.50 < f/f5 < -0.20;$$

and $$-1.0 < R12/f2 < 0.$$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
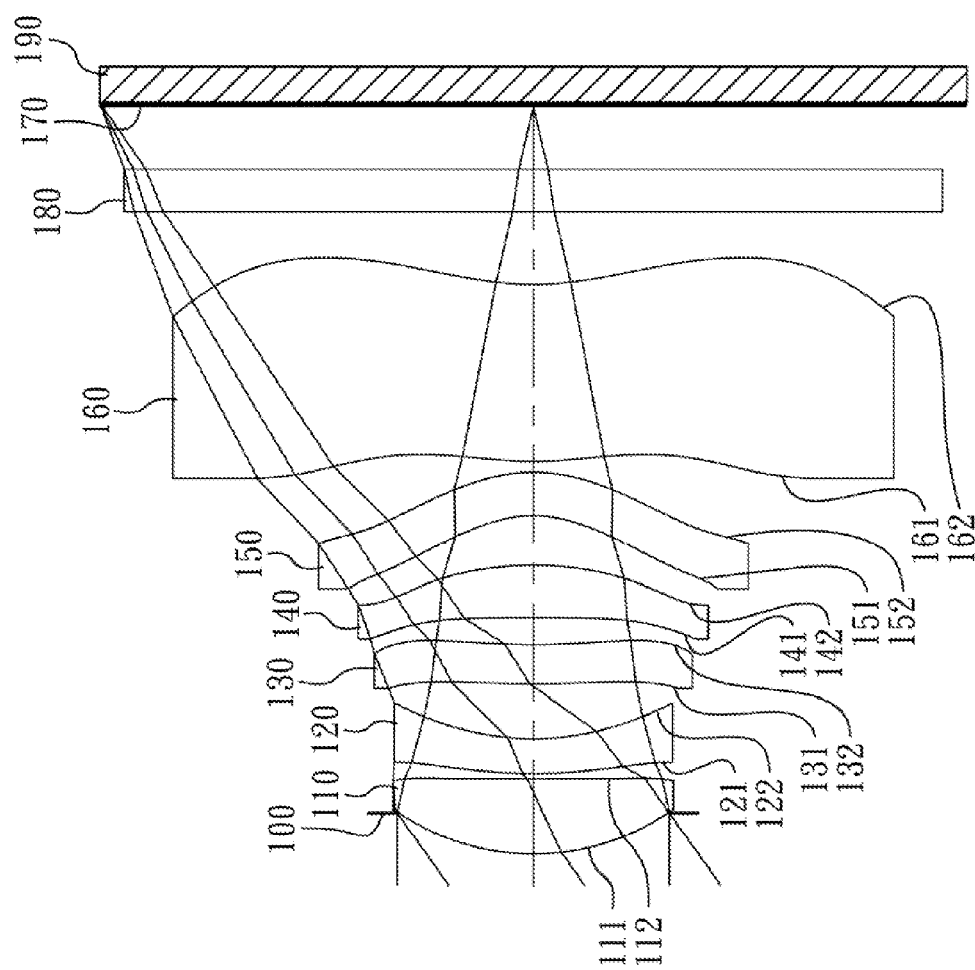
FIG. 1 is a schematic view of an image capturing optical lens system according to the 1st embodiment of the present disclosure.

An image capturing optical lens system includes, in order from an object side to an image side, a first lens element, a second lens element, a third lens element, a fourth lens element, a fifth lens element, and a sixth lens element. The image capturing optical lens system can further include an image sensor located on an image plane.

The first lens element with positive refractive power has an object-side surface being convex at a paraxial region thereof, and can have an image-side surface being concave at a paraxial region thereof, so that the total track length of the image capturing optical lens system can be reduced by adjusting the positive refractive power of the first lens element.

The second lens element has negative refractive power, so that the aberration generated from the first lens element can be corrected. The second lens element can have an object-side surface being convex at a paraxial region thereof, and can have an image-side surface being concave at a paraxial region thereof, so that the astigmatism of the image capturing optical lens system can be corrected.

The fourth lens element can have positive refractive power, and can have an image-side surface being convex at a paraxial region thereof. Therefore, it is favorable for reducing the system sensitivity to increase the manufacturing yield rate.

The fifth lens element with negative refractive power has an object-side surface being concave at a paraxial region thereof, and has an image-side surface being convex at a paraxial region thereof. Therefore, the Petzval sum of the image capturing optical lens system can be corrected effectively, so that the peripheral field of view can be better focused on the image plane with higher resolving power.

The sixth lens element can have an object-side surface being convex at a paraxial region thereof and has an image-side surface being concave at a paraxial region thereof. Therefore, the principal point of the image capturing optical lens system can be positioned away from the image plane, and the back focal length thereof can be reduced so as to keep the image capturing optical lens system compact. Furthermore, the image-side surface of the sixth lens element changes from concave at the paraxial region thereof to convex at a peripheral region thereof, so that the angle at which the incident light projects onto the image sensor from the off-axis field can be effectively reduced to increase the image-sensing efficiency of the image sensor, and the aberration of the off-axis field can be further corrected.

When a curvature radius of the object-side surface of the first lens element is R1, and a curvature radius of the image-side surface of the first lens element is R2, the following relationship is satisfied: $-3.0<(R1+R2)/(R1-R2)<0$. Therefore, the curvatures of the surfaces of the first lens element are proper for correcting the spherical aberration and the astigmatism of the image capturing optical lens system thereof. The total track length of the image capturing optical lens system can be reduced by adjusting the positive refractive power of the first lens element.

When a curvature radius of the object-side surface of the fifth lens element is R9, and a curvature radius of the image-side surface of the fifth lens element is R10, the following relationship is satisfied: $-0.50<(R9-R10)/(R9+R10)<0$. Therefore, the Petzval sum of the image capturing optical lens system can be effectively corrected by adjusting the curvatures of the surfaces of the fifth lens element, and the peripheral field of view can thereby be better focused on the image plane with higher resolving power. Preferably, the following relationship is satisfied: −0.35<(R9−R10)/(R9+R10)<0.

When an Abbe number of the fifth lens element is V5, and an Abbe number of the sixth lens element is V6, the following relationship is satisfied: 0.20<V5/V6<0.70. Therefore, the chromatic aberration of the image capturing optical lens system can be corrected.

When a focal length of the image capturing optical lens system is f, and a focal length of the fifth lens element is f5, the following relationship is satisfied: −1.50<f/f5<−0.20. Therefore, the Petzval sum of the image capturing optical lens system can be effectively corrected by adjusting the refractive power together with the curvatures of the surfaces of the fifth lens element, and the peripheral field of view can thereby be better focused on the image plane with higher resolving power. Preferably, the following relationship is satisfied: −1.20<f/f5<−0.20.

When a central thickness of the fifth lens element is CT5, and a central thickness of the sixth lens element is CT6, the following relationship is satisfied: 0.10<CT5/CT6<0.50. Therefore, the thicknesses of the lens elements are thereby favorable for manufacturing processes and yield rate; otherwise, the lens elements with an excessively thin thickness or an excessively thick thickness will be easily crackled or deformed during the manufacturing processes.

When the focal length of the image capturing optical lens system is f, and a focal length of the fourth lens element is f4, the following relationship is satisfied: 0.6<f/f4<1.8. Therefore, the distribution of the positive refractive power of the image capturing optical lens system can be balanced to correct the aberration by properly adjusting the refractive power of the fourth lens element.

When an axial distance between the image-side surface of the sixth lens element and the image plane is BFL, and an axial distance between the object-side surface of the first lens element and the image-side surface of the sixth lens element is Td, the following relationship is satisfied: 0.15<BFL/Td<0.4. Therefore, it is favorable for keeping the image capturing optical lens system compact by adjusting the BFL of the image capturing optical lens system.

When an Abbe number of the first lens element is V1, an Abbe number of the second lens element is V2, and the Abbe number of the fifth lens element is V5, the following relationship is satisfied: 0.6<(V2+V5)/V1<1.0. Therefore, it is favorable for correcting the chromatic aberration of the image capturing optical lens system.

When a central thickness of the second lens element is CT2, and an angle between a tangent of an inflection point on the image-side surface of the sixth lens element and an optical axis is a, the following relationship is satisfied: 0 mm<CT2/tan($\alpha$)<0.30 mm. Therefore, it is favorable for effectively reducing the angle at which the incident light projects onto the image sensor from the off-axis field to improve the image-sensing efficiency of the image sensor. Moreover, it is also favorable for correcting the aberration of the off-axis field to better assemble and manufacture the lens elements by properly adjusting the surface shape of the image-side surface of the sixth lens element and the central thickness of the second lens element. Preferably, the following relationship is satisfied: 0 mm<CT2/tan($\alpha$)<0.15 mm.

When a maximum image height of the image capturing optical lens system is ImgH (half of a diagonal length of an effective photosensitive area of the image sensor), and the focal length of the image capturing optical lens system is f, the following relationship is satisfied: 0.72<ImgH/f<1.0. Therefore, it is favorable for keeping the image capturing optical lens system compact in order to be applied to the compact and portable electronic products.

When the focal length of the image capturing optical lens system is f, the focal length of the fourth lens element is f4, the focal length of the fifth lens element is f5, and a focal length of the sixth lens element is f6, the following relationship is satisfied: 0.3<(|f/f5|+|f/f6|)/(f/f4)<1.5. Therefore, it is favorable for reducing the sensitivity to increase the manufacturing yield rate by adjusting the refractive power of the fourth lens element, the fifth lens element and the sixth lens element.

When the maximum image height of the image capturing optical lens system is ImgH, and an axial distance between the object-side surface of the first lens element and the image plane is TTL, the following relationship is satisfied: TTL/ImgH<1.8. Therefore, it is favorable for keeping the image capturing optical lens system compact in order to be applied to the compact and portable electronic products.

When a focal length of the second lens element is f2, and a curvature radius of the image-side surface of the sixth lens element is R12, the following relationship is satisfied: −1.0<R12/f2<0. Therefore, it is favorable for correcting the aberration, and the principal point of the image capturing optical lens system can be positioned away from the image plane for reducing the back focal length, so that the compact size of the image capturing optical lens system can be maintained.

According to the image capturing optical lens system of the present disclosure, the lens elements thereof can be made of plastic or glass material. When the lens elements are made of glass material, the distribution of the refractive power of the image capturing optical lens system may be more flexible to design. When the lens elements are made of plastic material, the manufacturing costs can be effectively reduced. Furthermore, the surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the image capturing optical lens system can also be reduced.

According to the image capturing optical lens system of the present disclosure, each of the object-side surface and the image-side surface of every lens element has a paraxial region and a peripheral region. The paraxial region refers to the region of the surface where light rays travel close to an optical axis and the peripheral region refers to the region of the surface where light rays travel away from the optical axis.

According to the image capturing optical lens system of the present disclosure, the image capturing optical lens system can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop disposed between an object and the first lens element provides a longer distance from an exit pupil of the system to the image plane and thereby the generated telecentric effect improves the image-sensing efficiency of the image sensor. A middle stop disposed between the first lens element and the image plane is favorable for enlarging the field of view of the image capturing optical lens system and thereby provides a wider field of view for the same.

According to the image capturing optical lens system of the present disclosure, the image capturing optical lens system is featured with good correcting ability and high image quality, and can be applied to 3D (three-dimensional) image capturing applications, in products such as digital cameras, mobile devices and tablets.

According to the above description of the present disclosure, the following 1st-11th specific embodiments are provided for further explanation.

1st Embodiment

Figure 2:
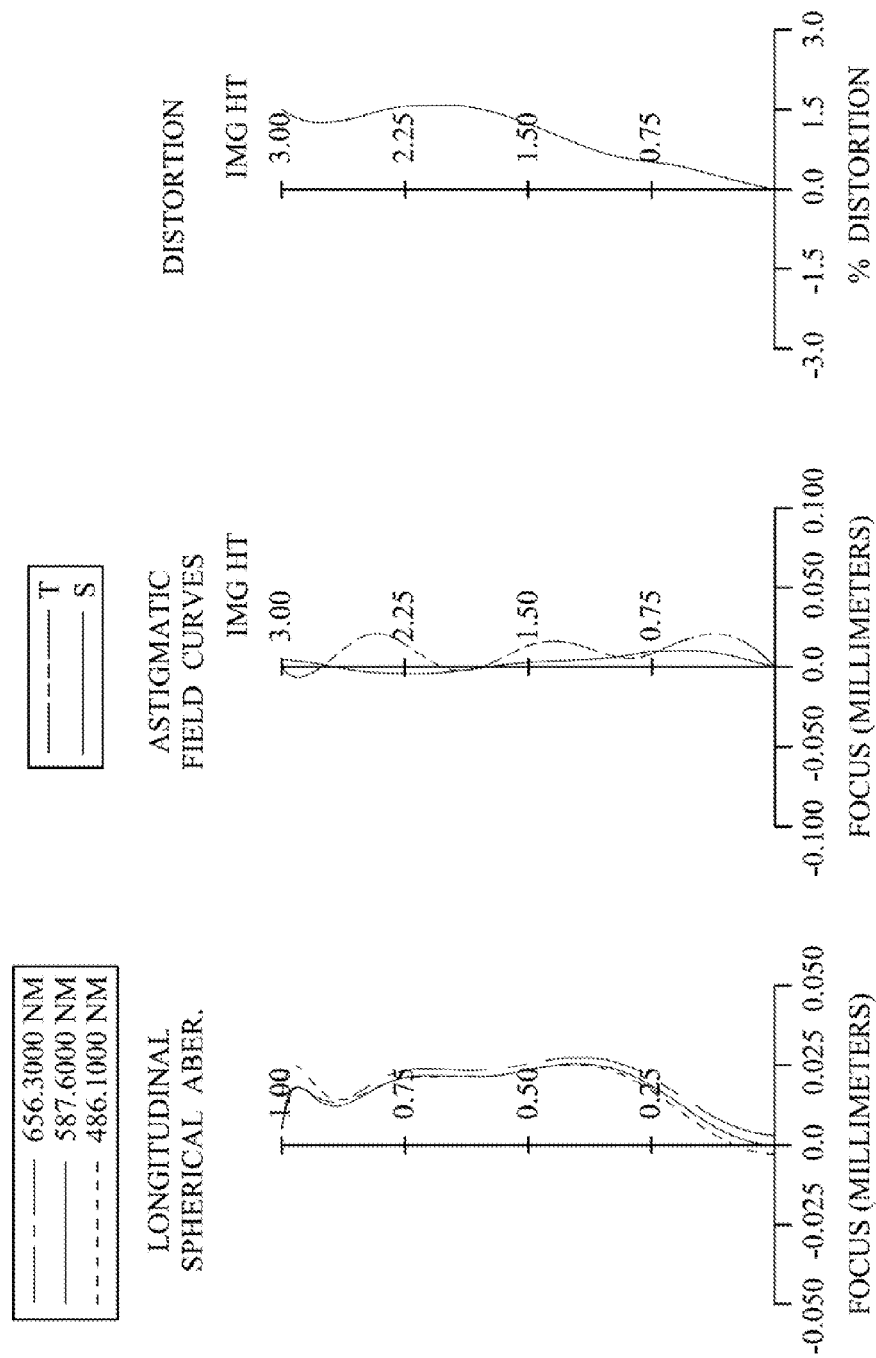
FIG. 2 shows spherical aberration curves, astigmatic field curves and a distortion curve of the image capturing optical lens system according to the 1st embodiment.

FIG. 1 is a schematic view of an image capturing optical lens system according to the 1st embodiment of the present disclosure. FIG. 2 shows spherical aberration curves, astigmatic field curves and a distortion curve of the image capturing optical lens system according to the 1st embodiment. In FIG. 1, the image capturing optical lens system includes, in order from an object side to an image side, an aperture stop 100, a first lens element 110, a second lens element 120, a third lens element 130, a fourth lens element 140, a fifth lens element 150, a sixth lens element 160, an IR-cut filter 180, an image plane 170, and an image sensor 190.

The first lens element 110 with positive refractive power has an object-side surface 111 being convex at a paraxial region thereof and an image-side surface 112 being concave at a paraxial region thereof. The first lens element 110 is made of plastic material and has the object-side surface 111 and the image-side surface 112 being both aspheric.

The second lens element 120 with negative refractive power has an object-side surface 121 being convex at a paraxial region thereof and an image-side surface 122 being concave at a paraxial region thereof. The second lens element 120 is made of plastic material and has the object-side surface 121 and the image-side surface 122 being both aspheric.

The third lens element 130 with negative refractive power has an object-side surface 131 being convex at a paraxial region thereof and an image-side surface 132 being concave at a paraxial region thereof. The third lens element 130 is made of plastic material and has the object-side surface 131 and the image-side surface 132 being both aspheric.

The fourth lens element 140 with positive refractive power has an object-side surface 141 being concave at a paraxial region thereof and an image-side surface 142 being convex at a paraxial region thereof. The fourth lens element 140 is made of plastic material and has the object-side surface 141 and the image-side surface 142 being both aspheric.

The fifth lens element 150 with negative refractive power has an object-side surface 151 being concave at a paraxial region thereof and an image-side surface 152 being convex at a paraxial region thereof. The fifth lens element 150 is made of plastic material and has the object-side surface 151 and the image-side surface 152 being both aspheric.

The sixth lens element 160 with positive refractive power has an object-side surface 161 being convex at a paraxial region thereof and an image-side surface 162 changing from concave at a paraxial region thereof to convex at a peripheral region thereof. The sixth lens element 160 is made of plastic material and has the object-side surface 161 and the image-side surface 162 being both aspheric.

The IR-cut filter 180 made of glass material is located between the sixth lens element 160 and the image plane 170, and will not affect a focal length of the image capturing optical lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing optical lens system according to the 1st embodiment, when a focal length of the image capturing optical lens system is f, an f-number of the image capturing optical lens system is Fno, and half of a maximal field of view of the image capturing optical lens system is HFOV, these parameters have the following values:

f=4.14 mm;

Fno=2.20; and

HFOV=35.4 degrees.

In the image capturing optical lens system according to the 1st embodiment, when an Abbe number of the first lens element 110 is V1, an Abbe number of the second lens element 120 is V2, an Abbe number of the fifth lens element 150 is V5, and an Abbe number of the sixth lens element 160 is V6, the following relationships are satisfied:

$(V2+V5)/V1=0.83;$ and $V5/V6=0.417.$

In the image capturing optical lens system according to the 1st embodiment, when a central thickness of the fifth lens element 150 is CT5, and a central thickness of the sixth lens element 160 is CT6, the following relationship is satisfied:

$CT5/CT6=0.24.$

In the image capturing optical lens system according to the 1st embodiment, when a curvature radius of the object-side surface 111 of the first lens element 110 is R1, and a curvature radius of the image-side surface 112 of the first lens element 110 is R2, the following relationship is satisfied:

$(R1+R2)/(R1-R2)=-1.07.$

In the image capturing optical lens system according to the 1st embodiment, when a curvature radius of the object-side surface 151 of the fifth lens element 150 is R9, and a curvature radius of the image-side surface 152 of the fifth lens element 150 is R10, the following relationship is satisfied:

$(R9-R10)/(R9+R10)=-0.17.$

In the image capturing optical lens system according to the 1st embodiment, when a focal length of the second lens element 120 is f2, and a curvature radius of the image-side surface 162 of the sixth lens element 160 is R12, the following relationship is satisfied:

$R12/f2=-0.31.$

In the image capturing optical lens system according to the 1st embodiment, when the focal length of the image capturing optical lens system is f, a focal length of the fourth lens element 140 is f4, a focal length of the fifth lens element 150 is f5, and a focal length of the sixth lens element 160 is f6, the following relationships are satisfied:

$$f/f4=0.89;$$

$$f/f5=-0.61;$$

and $$(|f/f5|+|f/f6|)/(f/f4)=0.73.$$

Figure 23:
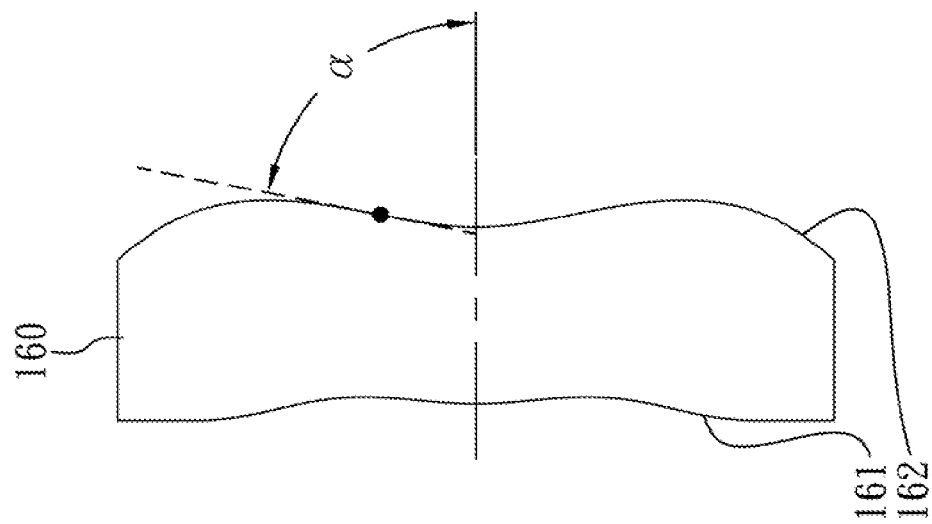
FIG. 23 shows $\alpha$ of the sixth lens element of the image capturing lens system as illustrated in FIG. 1.

FIG. 23 shows α of the sixth lens element 160 of the image capturing lens system as illustrated in FIG. 1. In FIG. 23, when an angle between a tangent of an inflection point on an image-side surface 162 of a sixth lens element 160 and an optical axis is α, and a central thickness of the second lens element 120 is CT2, the following relationship is satisfied:

$$CT2/\tan(\alpha)=0.05 \text{ mm}.$$

In the image capturing optical lens system according to the 1st embodiment, when an axial distance between the image-side surface 162 of the sixth lens element 160 and the image plane 170 is BFL, and an axial distance between the object-side surface 111 of the first lens element 110 and the image-side surface 162 of the sixth lens element 160 is Td, the following relationship is satisfied:

$$BFL/Td=0.29.$$

In the image capturing optical lens system according to the 1st embodiment, when a maximum image height of the image capturing optical lens system is ImgH which here is a half of the diagonal length of the photosensitive area of the image sensor 190 on the image plane 170, the focal length of the image capturing optical lens system is f, and an axial distance between the object-side surface 111 of the first lens element 110 and the image plane 170 is TTL, the following relationships are satisfied:

$$ImgH/f=0.724;$$

and $$TTL/ImgH=1.70.$$

The detailed optical data of the 1st embodiment are shown in Table 1, and the aspheric surface data are shown in Table 2 below.

TABLE 1

1st Embodiment
f = 4.14 mm, Fno = 2.20, HFOV = 35.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.283 | | | | |
| 2 | Lens 1 | 1.688 | (ASP) | 0.523 | Plastic | 1.544 | 55.9 | 3.20 |
| 3 | | 47.745 | (ASP) | 0.036 | | | | |
| 4 | Lens 2 | 3.044 | (ASP) | 0.240 | Plastic | 1.640 | 23.3 | −6.34 |
| 5 | | 1.685 | (ASP) | 0.380 | | | | |
| 6 | Lens 3 | 7.907 | (ASP) | 0.274 | Plastic | 1.544 | 55.9 | −25.07 |
| 7 | | 4.945 | (ASP) | 0.186 | | | | |
| 8 | Lens 4 | −205.400 | (ASP) | 0.360 | Plastic | 1.544 | 55.9 | 4.64 |
| 9 | | −2.494 | (ASP) | 0.347 | | | | |
| 10 | Lens 5 | −0.818 | (ASP) | 0.300 | Plastic | 1.640 | 23.3 | −6.84 |
| 11 | | −1.150 | (ASP) | 0.072 | | | | |
| 12 | Lens 6 | 2.293 | (ASP) | 1.229 | Plastic | 1.544 | 55.9 | 95.61 |
| 13 | | 1.946 | (ASP) | 0.500 | | | | |
| 14 | IR-cut filter | Plano | | 0.300 | Glass | 1.517 | 64.2 | — |
| 15 | | Plano | | 0.449 | | | | |
| 16 | Image | Plano | | — | | | | |

Note:
Reference wavelength (d-line) is 587.6 nm.

TABLE 2

Aspheric Coefficients

| Surface # | | | | | |
|---|---|---|---|---|---|
| 2 | 3 | 4 | 5 | 6 | 7 |
| k = 1.8655E−01 | 5.0000E+00 | −2.0784E+01 | −5.0621E+00 | 0.0000E+00 | 0.0000E+00 |
| A4 = −6.1899E−04 | −4.5527E−02 | −7.1197E−02 | 2.5381E−03 | −7.0538E−02 | −7.8575E−02 |
| A6 = 2.8358E−02 | 1.2620E−01 | 1.2670E−01 | 4.2100E−02 | −4.2775E−02 | −1.0851E−02 |
| A8 = −5.0099E−02 | −1.0849E−01 | −3.6051E−02 | 9.4901E−02 | 6.0982E−02 | −2.6489E−02 |
| A10 = −3.4127E−03 | −1.1151E−02 | −1.2216E−01 | −2.2870E−01 | −4.2446E−02 | 1.4271E−03 |
| A12 = 9.9599E−02 | 4.2875E−02 | 4.4865E−02 | 1.5329E−01 | −4.0004E−11 | −2.6097E−10 |
| A14 = −7.7512E−02 | −3.6527E−02 | 1.5158E−02 | −2.4257E−02 | — | — |

| Surface # | | | | | |
|---|---|---|---|---|---|
| 8 | 9 | 10 | 11 | 12 | 13 |
| k = −4.0000E+01 | 1.6416E+00 | −3.7855E+00 | −8.1718E−01 | −3.1624E+01 | −9.1133E+00 |
| A4 = −9.7160E−02 | −4.3991E−02 | −4.9566E−02 | 1.3509E−01 | −1.2831E−01 | −5.1858E−02 |
| A6 = −5.6079E−03 | −1.7664E−02 | −1.4184E−02 | −3.7856E−02 | 7.0118E−02 | 2.0398E−02 |

TABLE 2-continued

Aspheric Coefficients

| A8 =  | 6.6760E−03  | 2.7241E−02  | 1.2088E−01  | 1.7679E−02  | −4.1873E−02 | −8.2739E−03 |
|-------|-------------|-------------|-------------|-------------|-------------|-------------|
| A10 = | −3.6560E−02 | 3.6468E−02  | −5.2829E−02 | 8.4334E−03  | 2.0999E−02  | 2.2506E−03  |
| A12 = | −8.1389E−03 | −3.5812E−03 | −1.0632E−02 | −3.2045E−03 | −5.8979E−03 | −3.8544E−04 |
| A14 = | 9.1601E−02  | −6.5876E−03 | 4.8246E−03  | −2.5396E−03 | 8.2208E−04  | 3.6567E−05  |
| A16 = | −4.8470E−02 | —           | 4.0110E−04  | 8.1636E−04  | −4.4862E−05 | −1.4339E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
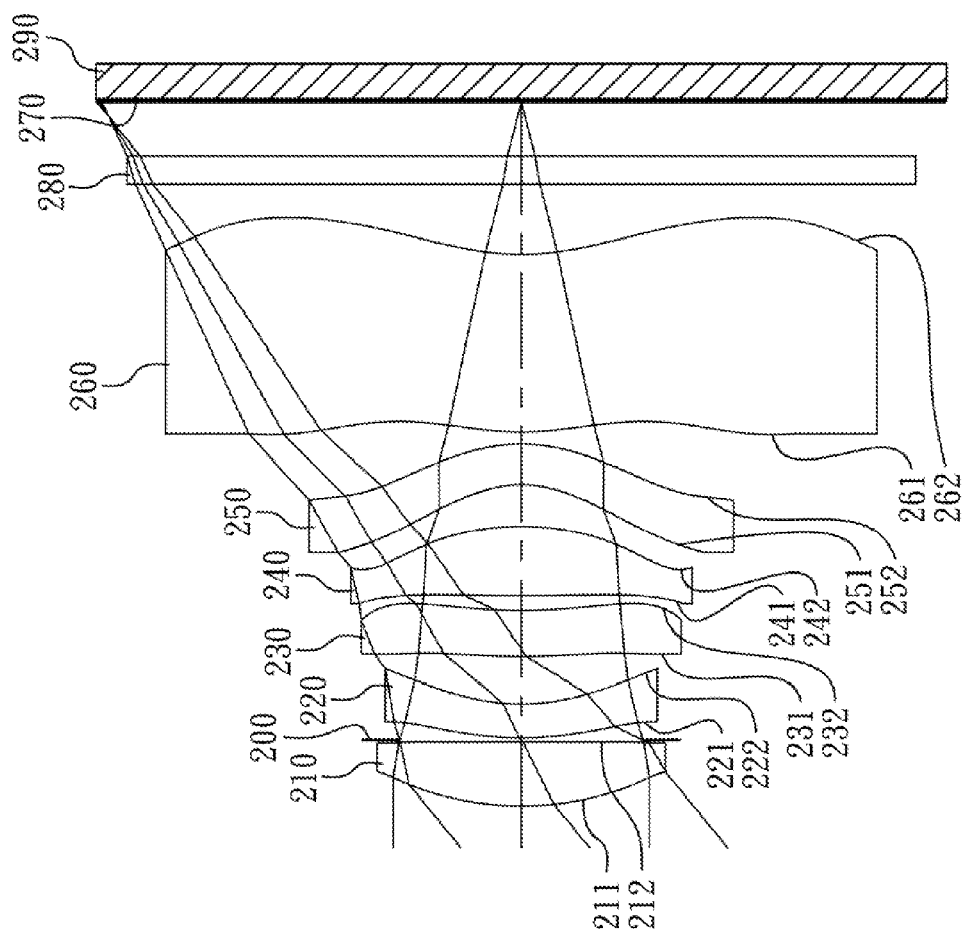
FIG. 3 is a schematic view of an image capturing optical lens system according to the 2nd embodiment of the present disclosure.
Figure 4:
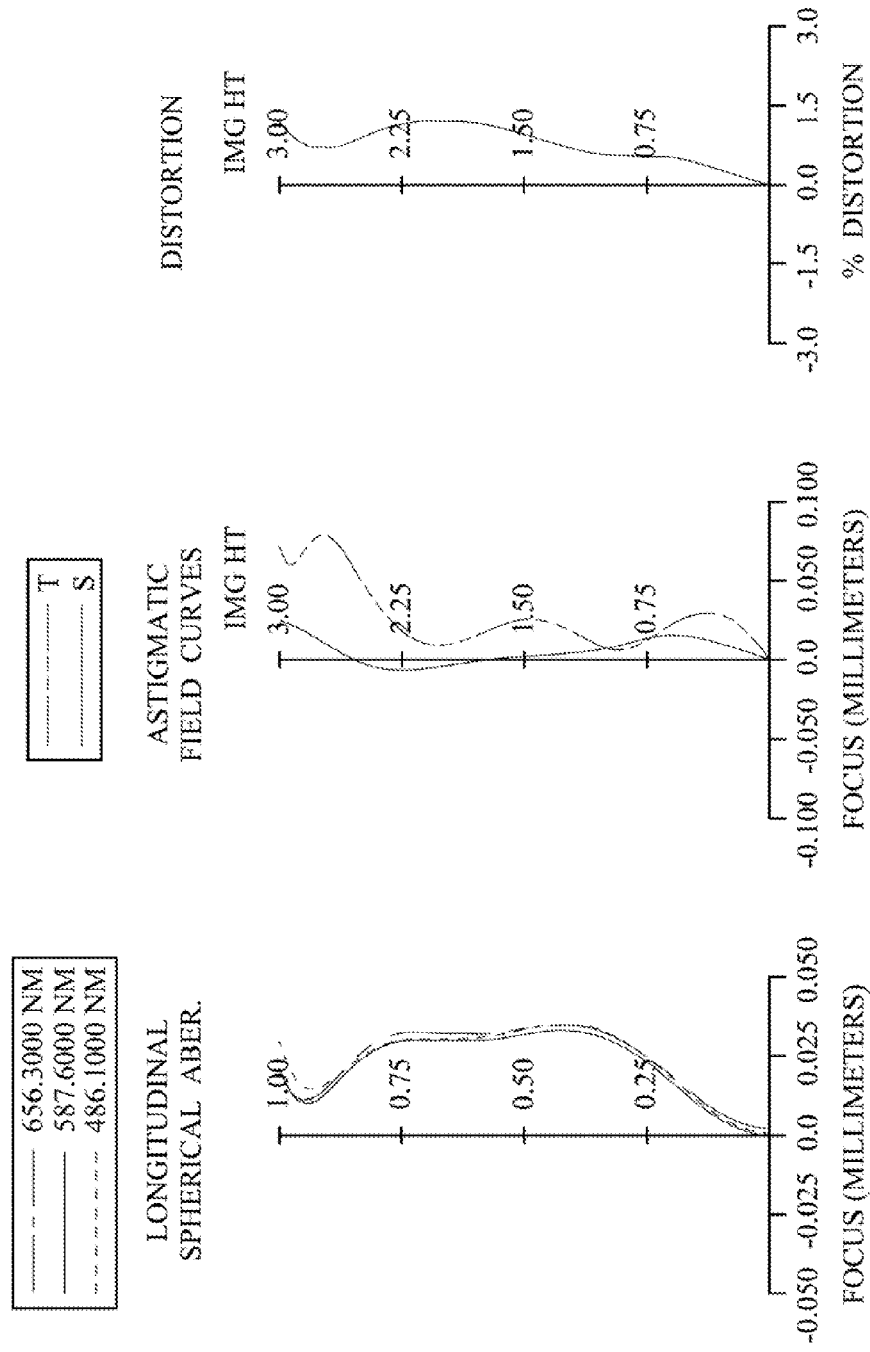
FIG. 4 shows spherical aberration curves, astigmatic field curves and a distortion curve of the image capturing optical lens system according to the 2nd embodiment.

FIG. 3 is a schematic view of an image capturing optical lens system according to the 2nd embodiment of the present disclosure. FIG. 4 shows spherical aberration curves, astigmatic field curves and a distortion curve of the image capturing optical lens system according to the 2nd embodiment. In FIG. 3, the image capturing optical lens system includes, in order from an object side to an image side, a first lens element 210, an aperture stop 200, a second lens element 220, a third lens element 230, a fourth lens element 240, a fifth lens element 250, a sixth lens element 260, an IR-cut filter 280, an image plane 270, and an image sensor 290.

The first lens element 210 with positive refractive power has an object-side surface 211 being convex at a paraxial region thereof and an image-side surface 212 being concave at a paraxial region thereof. The first lens element 210 is made of plastic material and has the object-side surface 211 and the image-side surface 212 being both aspheric.

The second lens element 220 with negative refractive power has an object-side surface 221 being convex at a paraxial region thereof and an image-side surface 222 being concave at a paraxial region thereof. The second lens element 220 is made of plastic material and has the object-side surface 221 and the image-side surface 222 being both aspheric.

The third lens element 230 with negative refractive power has an object-side surface 231 being convex at a paraxial region thereof and an image-side surface 232 being concave at a paraxial region thereof. The third lens element 230 is made of plastic material and has the object-side surface 231 and the image-side surface 232 being both aspheric.

The fourth lens element 240 with positive refractive power has an object-side surface 241 being convex at a paraxial region thereof and an image-side surface 242 being convex at a paraxial region thereof. The fourth lens element 240 is made of plastic material and has the object-side surface 241 and the image-side surface 242 being both aspheric.

The fifth lens element 250 with negative refractive power has an object-side surface 251 being concave at a paraxial region thereof and an image-side surface 252 being convex at a paraxial region thereof. The fifth lens element 250 is made of plastic material and has the object-side surface 251 and the image-side surface 252 being both aspheric.

The sixth lens element 260 with positive refractive power has an object-side surface 261 being convex at a paraxial region thereof and an image-side surface 262 changing from concave at a paraxial region thereof to convex at a peripheral region thereof. The sixth lens element 260 is made of plastic material and has the object-side surface 261 and the image-side surface 262 being both aspheric.

The IR-cut filter 280 made of glass material is located between the sixth lens element 260 and the image plane 270, and will not affect a focal length of the image capturing optical lens system.

The detailed optical data of the 2nd embodiment are shown in Table 3, and the aspheric surface data are shown in Table 4 below.

TABLE 3

2nd Embodiment
f = 3.64 mm, Fno = 2.00, HFOV = 39.0 deg.

| Surface # |           | Curvature Radius |       | Thickness | Material | Index | Abbe # | Focal length |
|-----------|-----------|------------------|-------|-----------|----------|-------|--------|--------------|
| 0         | Object    | Plano            |       | Infinity  |          |       |        |              |
| 1         | Lens 1    | 2.153            | (ASP) | 0.458     | Plastic  | 1.572 | 58.7   | 3.79         |
| 2         |           | 335.570          | (ASP) | 0.012     |          |       |        |              |
| 3         | Ape. Stop | Plano            |       | 0.016     |          |       |        |              |
| 4         | Lens 2    | 2.155            | (ASP) | 0.240     | Plastic  | 1.634 | 23.8   | −7.49        |
| 5         |           | 1.418            | (ASP) | 0.337     |          |       |        |              |
| 6         | Lens 3    | 5.467            | (ASP) | 0.329     | Plastic  | 1.544 | 55.9   | −19.12       |
| 7         |           | 3.508            | (ASP) | 0.105     |          |       |        |              |
| 8         | Lens 4    | 10.749           | (ASP) | 0.491     | Plastic  | 1.544 | 55.9   | 3.07         |
| 9         |           | −1.949           | (ASP) | 0.300     |          |       |        |              |
| 10        | Lens 5    | −0.760           | (ASP) | 0.285     | Plastic  | 1.634 | 23.8   | −4.25        |
| 11        |           | −1.214           | (ASP) | 0.084     |          |       |        |              |
| 12        | Lens 6    | 1.725            | (ASP) | 1.268     | Plastic  | 1.535 | 56.3   | 12.39        |
| 13        |           | 1.736            | (ASP) | 0.500     |          |       |        |              |

TABLE 3-continued

2nd Embodiment
f = 3.64 mm, Fno = 2.00, HFOV = 39.0 deg.

| Surface # | | Curvature Radius | Thickness | Material | Index | Abbe # | Focal length |
|---|---|---|---|---|---|---|---|
| 14 | IR-cut filter | Plano | 0.200 | Glass | 1.517 | 64.2 | — |
| 15 | | Plano | 0.395 | | | | |
| 16 | Image | Plano | — | | | | |

Note:
Reference wavelength (d-line) is 587.6 nm.

TABLE 4

Aspheric Coefficients

| | Surface # | | | | | |
|---|---|---|---|---|---|---|
| | 1 | 2 | 4 | 5 | 6 | 7 |
| k = | 2.4457E−01 | −2.0000E+01 | −1.3449E+01 | −4.3098E+00 | −1.4316E+01 | −1.0637E+01 |
| A4 = | −3.5922E−03 | −3.0418E−02 | −2.7734E−02 | −2.1105E−02 | −7.5590E−02 | −7.4219E−02 |
| A6 = | 3.8748E−02 | 1.2918E−01 | 6.5777E−02 | 3.8720E−02 | −4.3505E−02 | 4.1101E−02 |
| A8 = | −7.2214E−02 | −1.6441E−01 | −1.2333E−01 | 7.6934E−02 | 3.6620E−02 | −8.3615E−02 |
| A10 = | 4.6314E−03 | 2.8122E−02 | −1.4011E−01 | −2.2788E−01 | 1.3003E−02 | 1.1203E−02 |
| A12 = | 9.9599E−02 | 4.2875E−02 | 4.4865E−02 | 1.5329E−01 | −5.9070E−11 | 1.5762E−03 |
| A14 = | −7.7512E−02 | −3.6527E−02 | 1.5158E−02 | −2.4257E−02 | — | — |

| | Surface # | | | | | |
|---|---|---|---|---|---|---|
| | 8 | 9 | 10 | 11 | 12 | 13 |
| k = | −2.0000E+01 | 1.0656E+00 | −3.7586E+00 | −8.4885E−01 | −2.0000E+01 | −6.7333E+00 |
| A4 = | −8.1612E−02 | −2.9725E−02 | −4.8386E−02 | 1.3364E−01 | −1.2827E−01 | −4.9930E−02 |
| A6 = | 3.7678E−02 | −1.3289E−03 | −2.1777E−02 | −2.9464E−02 | 7.0279E−02 | 2.0733E−02 |
| A8 = | 2.9213E−02 | 2.3233E−02 | 1.2848E−01 | 1.5336E−02 | −4.1651E−02 | −8.2814E−03 |
| A10 = | −7.4599E−02 | 3.7969E−02 | −5.0342E−02 | 7.8336E−03 | 2.0986E−02 | 2.2581E−03 |
| A12 = | −4.2027E−02 | 1.7118E−03 | −1.2548E−02 | −3.0509E−03 | −5.9073E−03 | −3.8625E−04 |
| A14 = | 1.1763E−01 | −6.0820E−03 | 4.0294E−03 | −2.4660E−03 | 8.2073E−04 | 3.6257E−05 |
| A16 = | −4.8470E−02 | — | 1.3739E−03 | 7.9323E−04 | −4.4360E−05 | −1.3893E−06 |

In the image capturing optical lens system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| f (mm) | 3.64 | R12/f2 | −0.23 |
|---|---|---|---|
| Fno | 2.00 | f/f4 | 1.18 |
| HFOV (deg.) | 39.0 | f/f5 | −0.86 |
| (V2 + V5)/V1 | 0.81 | (|f/f5| + |f/f6|)/(f/f4) | 0.97 |
| V5/V6 | 0.423 | CT2/tan(α) (mm) | 0.06 |
| CT5/CT6 | 0.22 | BFL/Td | 0.26 |
| (R1 + R2)/(R1 − R2) | −1.01 | ImgH/f | 0.824 |
| (R9 − R10)/(R9 + R10) | −0.23 | TTL/ImgH | 1.65 |

3rd Embodiment

Figure 5:
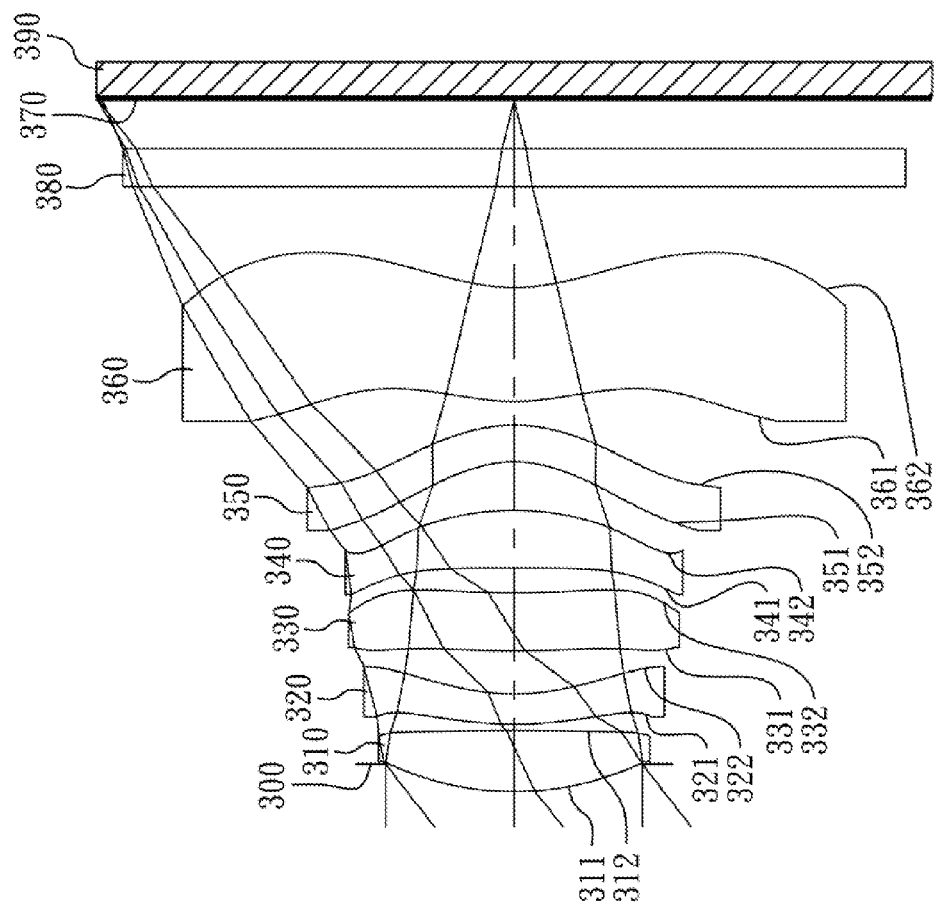
FIG. 5 is a schematic view of an image capturing optical lens system according to the 3rd embodiment of the present disclosure.
Figure 6:
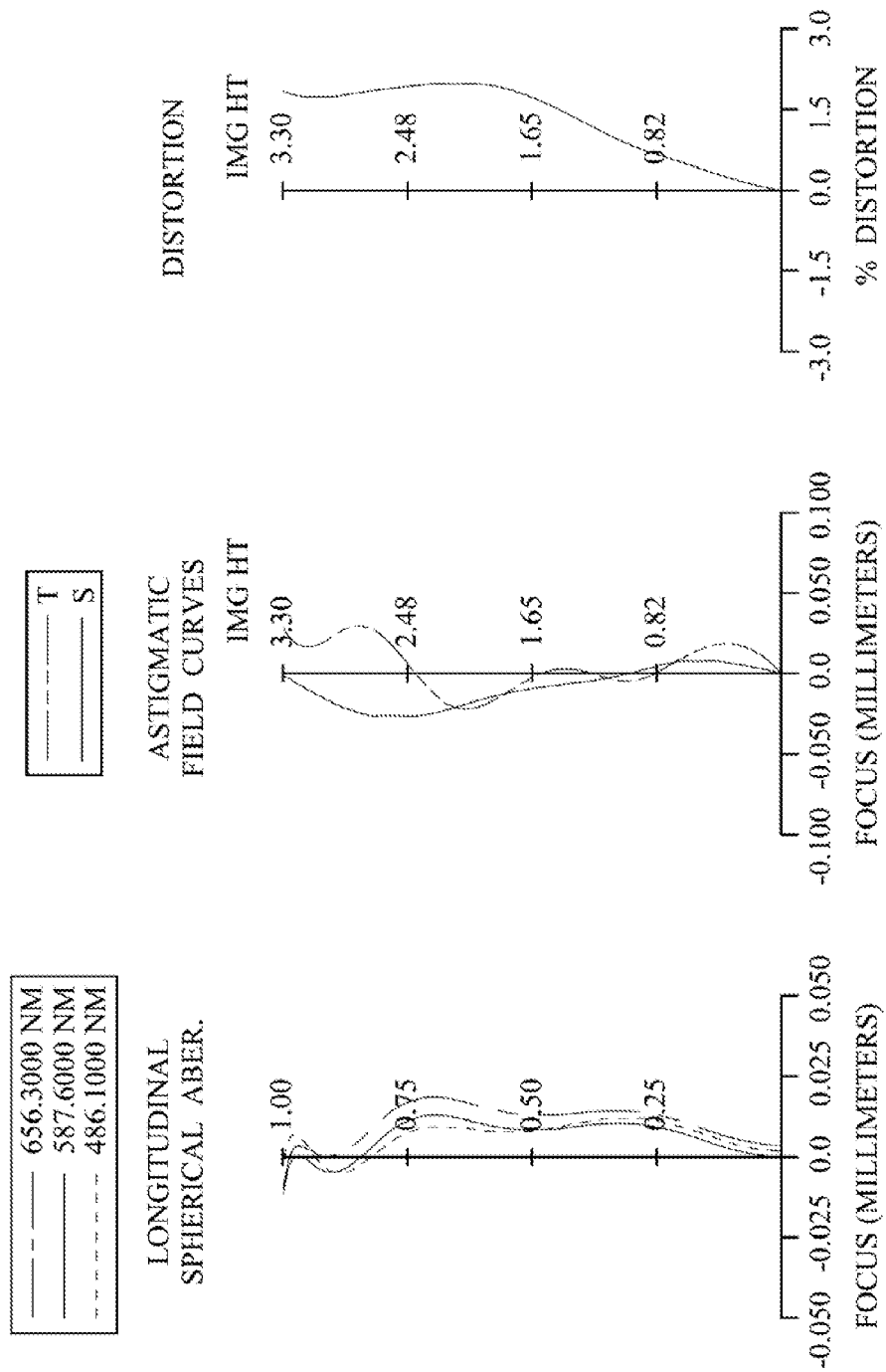
FIG. 6 shows spherical aberration curves, astigmatic field curves and a distortion curve of the image capturing optical lens system according to the 3rd embodiment.

FIG. 5 is a schematic view of an image capturing optical lens system according to the 3rd embodiment of the present disclosure. FIG. 6 shows spherical aberration curves, astigmatic field curves and a distortion curve of the image capturing optical lens system according to the 3rd embodiment. In FIG. 5, the image capturing optical lens system includes, in order from an object side to an image side, an aperture stop 300, a first lens element 310, a second lens element 320, a third lens element 330, a fourth lens element 340, a fifth lens element 350, a sixth lens element 360, an IR-cut filter 380, an image plane 370, and an image sensor 390.

The first lens element 310 with positive refractive power has an object-side surface 311 being convex at a paraxial region thereof and an image-side surface 312 being convex at a paraxial region thereof. The first lens element 310 is made of plastic material and has the object-side surface 311 and the image-side surface 312 being both aspheric.

The second lens element 320 with negative refractive power has an object-side surface 321 being convex at a paraxial region thereof and an image-side surface 322 being concave at a paraxial region thereof. The second lens element 320 is made of plastic material and has the object-side surface 321 and the image-side surface 322 being both aspheric.

The third lens element 330 with negative refractive power has an object-side surface 331 being convex at a paraxial region thereof and an image-side surface 332 being concave at a paraxial region thereof. The third lens element 330 is made of plastic material and has the object-side surface 331 and the image-side surface 332 being both aspheric.

The fourth lens element 340 with positive refractive power has an object-side surface 341 being convex at a paraxial region thereof and an image-side surface 342 being convex at a paraxial region thereof. The fourth lens element 340 is made of plastic material and has the object-side surface 341 and the image-side surface 342 being both aspheric.

The fifth lens element 350 with negative refractive power has an object-side surface 351 being concave at a paraxial region thereof and an image-side surface 352 being convex at a paraxial region thereof. The fifth lens element 350 is made of plastic material and has the object-side surface 351 and the image-side surface 352 being both aspheric.

The sixth lens element 360 with positive refractive power has an object-side surface 361 being convex at a paraxial region thereof and an image-side surface 362 changing from concave at a paraxial region thereof to convex at a peripheral region thereof. The sixth lens element 360 is made of plastic material and has the object-side surface 361 and the image-side surface 362 being both aspheric.

The IR-cut filter 380 made of glass material is located between the sixth lens element 360 and the image plane 370, and will not affect a focal length of the image capturing optical lens system.

The detailed optical data of the 3rd embodiment are shown in Table 5, and the aspheric surface data are shown in Table 6 below.

TABLE 5

3rd Embodiment
f = 4.20 mm, Fno = 2.07, HFOV = 37.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.217 | | | | |
| 2 | Lens 1 | 2.370 | (ASP) | 0.483 | Plastic | 1.543 | 56.5 | 3.96 |
| 3 | | −21.803 | (ASP) | 0.050 | | | | |
| 4 | Lens 2 | 2.747 | (ASP) | 0.240 | Plastic | 1.650 | 21.4 | −7.65 |
| 5 | | 1.708 | (ASP) | 0.338 | | | | |
| 6 | Lens 3 | 8.160 | (ASP) | 0.461 | Plastic | 1.543 | 56.5 | −39.26 |
| 7 | | 5.785 | (ASP) | 0.197 | | | | |
| 8 | Lens 4 | 305.985 | (ASP) | 0.456 | Plastic | 1.543 | 56.5 | 4.22 |
| 9 | | −2.310 | (ASP) | 0.386 | | | | |
| 10 | Lens 5 | −0.914 | (ASP) | 0.285 | Plastic | 1.640 | 23.3 | −7.70 |
| 11 | | −1.258 | (ASP) | 0.192 | | | | |
| 12 | Lens 6 | 1.715 | (ASP) | 0.900 | Plastic | 1.543 | 56.5 | 135.54 |
| 13 | | 1.431 | (ASP) | 0.800 | | | | |
| 14 | IR-cut filter | Plano | | 0.300 | Glass | 1.517 | 64.2 | — |
| 15 | | Plano | | 0.400 | | | | |
| 16 | Image | Plano | | — | | | | |

Note:
Reference wavelength (d-line) is 587.6 nm.

TABLE 6

Aspheric Coefficients

| | Surface # | | | | | |
|---|---|---|---|---|---|---|
| | 2 | 3 | 4 | 5 | 6 | 7 |
| k = | 2.5381E−01 | −2.0000E+01 | −1.9708E+01 | −5.5454E+00 | 2.8590E−00 | −1.2693E+01 |
| A4 = | −4.3261E−04 | −3.7924E−04 | −2.8028E−02 | −3.3774E−02 | −5.5935E−02 | −6.6442E−02 |
| A6 = | 1.0703E−02 | 6.4702E−02 | 2.8578E−02 | 1.8018E−02 | −1.9881E−02 | 1.9509E−02 |
| A8 = | −1.6978E−02 | −8.8112E−02 | −1.8991E−02 | 3.8009E−02 | 1.5339E−02 | −4.5863E−02 |
| A10 = | 7.9623E−05 | 3.3050E−02 | −3.9010E−02 | −9.9688E−02 | 5.6330E−03 | 6.6107E−03 |
| A12 = | 2.8188E−02 | 6.1037E−03 | 1.7352E−02 | 5.4569E−02 | −6.2692E−04 | 4.0076E−03 |
| A14 = | −2.1606E−02 | −1.5862E−02 | −8.7443E−03 | −8.0099E−03 | — | — |

| | Surface # | | | | | |
|---|---|---|---|---|---|---|
| | 8 | 9 | 10 | 11 | 12 | 13 |
| k = | −2.0000E+01 | 1.1076E+00 | −3.7451E+00 | −7.8937E−01 | −1.2153E+01 | −5.8456E+00 |
| A4 = | −7.6005E−02 | −3.0540E−02 | −3.9649E−02 | 1.0498E−01 | −1.1171E−01 | −5.3577E−02 |
| A6 = | −3.8014E−03 | −5.8796E−03 | −1.5555E−02 | −1.9811E−02 | 4.2713E−02 | 1.5409E−02 |
| A8 = | 1.2471E−02 | 8.1726E−03 | 6.4762E−02 | 8.4971E−03 | −2.1124E−02 | −4.5079E−03 |
| A10 = | −2.7696E−02 | 1.4417E−02 | −2.1115E−02 | 3.4516E−03 | 8.9390E−03 | 9.5885E−04 |
| A12 = | −1.1912E−02 | 7.0797E−04 | −4.0215E−03 | −1.0628E−03 | −2.0697E−03 | −1.3318E−04 |
| A14 = | 3.4966E−02 | −9.5575E−04 | 1.2756E−03 | −7.0899E−04 | 2.3709E−04 | 1.0479E−05 |
| A16 = | −1.2080E−02 | — | 2.4717E−04 | 1.8710E−04 | −1.0734E−05 | −3.5225E−07 |

In the image capturing optical lens system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 4.20 | R12/f2 | −0.19 |
| Fno | 2.07 | f/f4 | 1.00 |
| HFOV (deg.) | 37.6 | f/f5 | −0.55 |
| (V2 + V5)/V1 | 0.79 | (|f/f5| + |f/f6|)/(f/f4) | 0.58 |
| V5/V6 | 0.412 | CT2/tan(α) (mm) | 0.07 |
| CT5/CT6 | 0.32 | BFL/Td | 0.35 |
| (R1 + R2)/(R1 − R2) | −0.80 | ImgH/f | 0.785 |
| (R9 − R10)/(R9 + R10) | −0.16 | TTL/ImgH | 1.63 |

4th Embodiment

Figure 7:
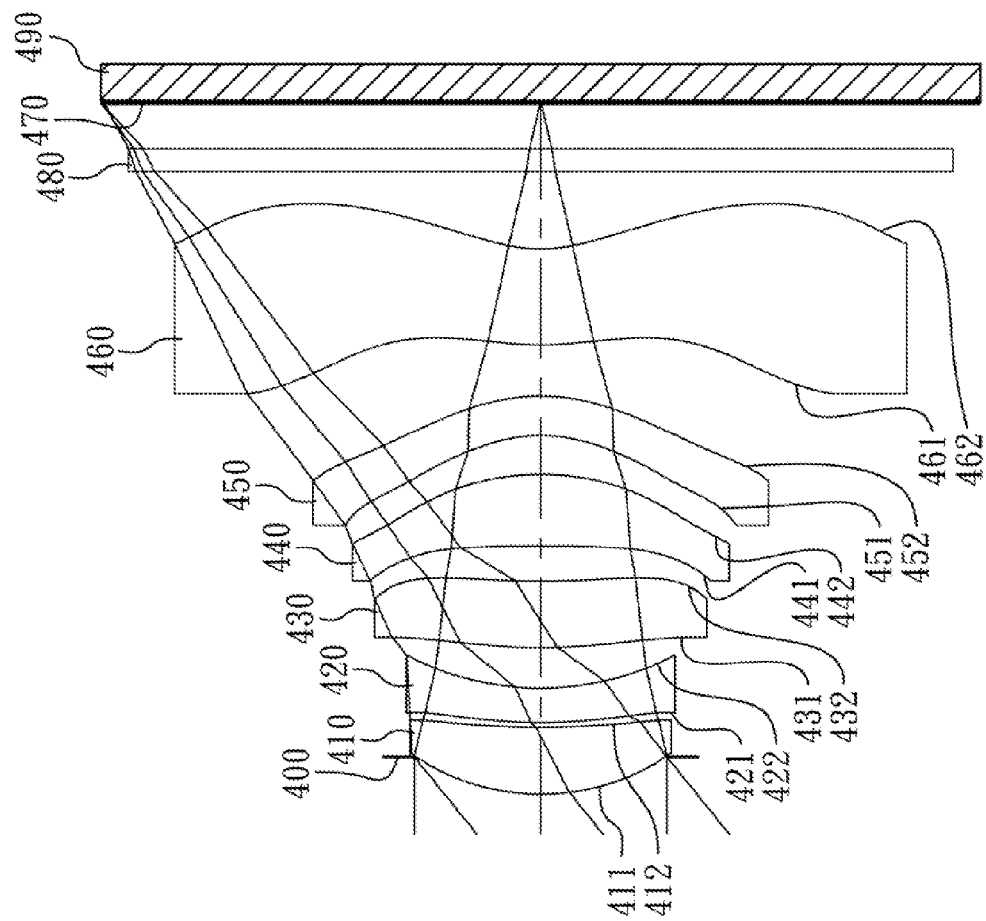
FIG. 7 is a schematic view of an image capturing optical lens system according to the 4th embodiment of the present disclosure.
Figure 8:
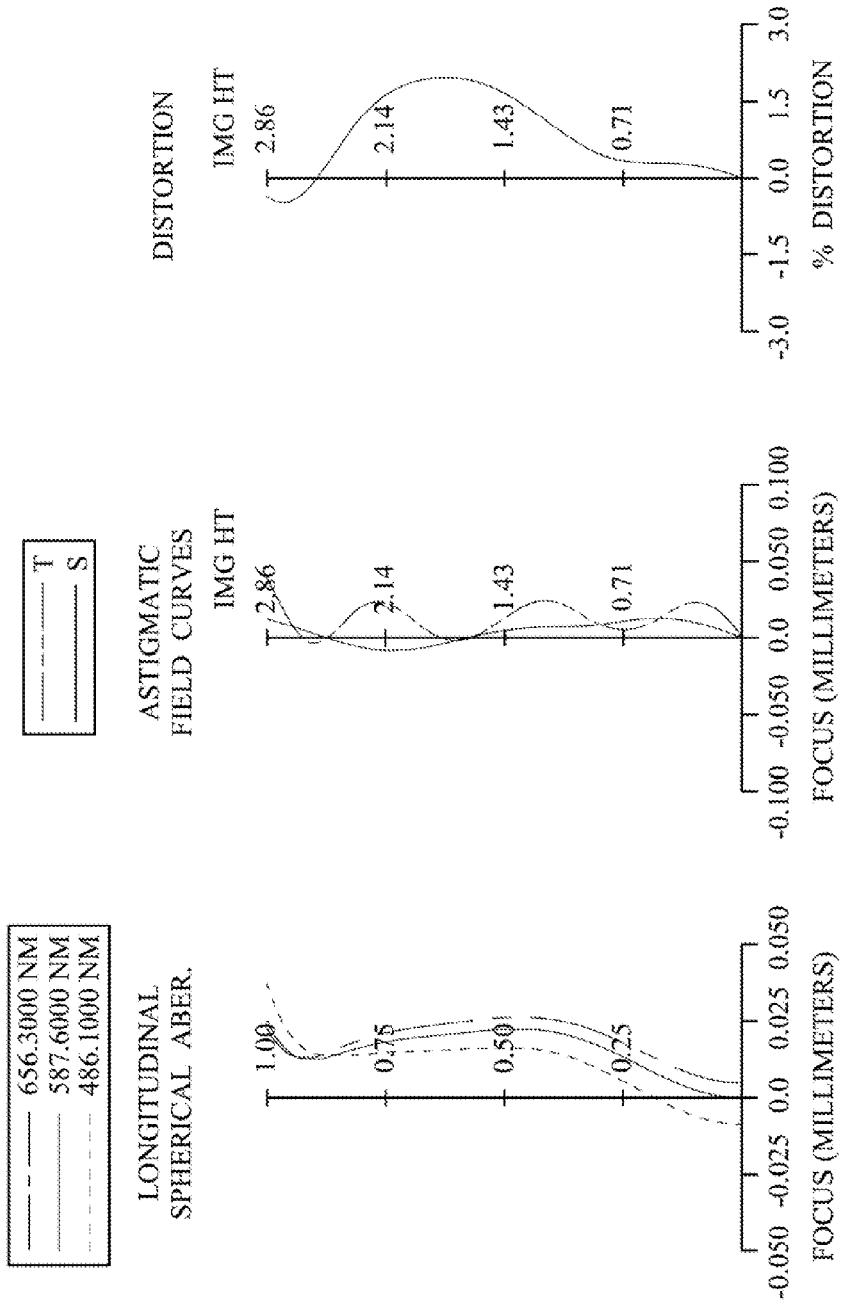
FIG. 8 shows spherical aberration curves, astigmatic field curves and a distortion curve of the image capturing optical lens system according to the 4th embodiment.

FIG. 7 is a schematic view of an image capturing optical lens system according to the 4th embodiment of the present disclosure. FIG. 8 shows spherical aberration curves, astigmatic field curves and a distortion curve of the image capturing optical lens system according to the 4th embodiment. In FIG. 7, the image capturing optical lens system includes, in order from an object side to an image side, an aperture stop 400, a first lens element 410, a second lens element 420, a third lens element 430, a fourth lens element 440, a fifth lens element 450, a sixth lens element 460, an IR-cut filter 480, an image plane 470, and an image sensor 490.

The first lens element 410 with positive refractive power has an object-side surface 411 being convex at a paraxial region thereof and an image-side surface 412 being concave at a paraxial region thereof. The first lens element 410 is made of plastic material and has the object-side surface 411 and the image-side surface 412 being both aspheric.

The second lens element 420 with negative refractive power has an object-side surface 421 being convex at a paraxial region thereof and an image-side surface 422 being concave at a paraxial region thereof. The second lens element 420 is made of plastic material and has the object-side surface 421 and the image-side surface 422 being both aspheric.

The third lens element 430 with positive refractive power has an object-side surface 431 being convex at a paraxial region thereof and an image-side surface 432 being concave at a paraxial region thereof. The third lens element 430 is made of plastic material and has the object-side surface 431 and the image-side surface 432 being both aspheric.

The fourth lens element 440 with positive refractive power has an object-side surface 441 being concave at a paraxial region thereof and an image-side surface 442 being convex at a paraxial region thereof. The fourth lens element 440 is made of plastic material and has the object-side surface 441 and the image-side surface 442 being both aspheric.

The fifth lens element 450 with negative refractive power has an object-side surface 451 being concave at a paraxial region thereof and an image-side surface 452 being convex at a paraxial region thereof. The fifth lens element 450 is made of plastic material and has the object-side surface 451 and the image-side surface 452 being both aspheric.

The sixth lens element 460 with negative refractive power has an object-side surface 461 being convex at a paraxial region thereof and an image-side surface 462 changing from concave at a paraxial region thereof to convex at a peripheral region thereof. The sixth lens element 460 is made of plastic material and has the object-side surface 461 and the image-side surface 462 being both aspheric.

The IR-cut filter 480 made of glass material is located between the sixth lens element 460 and the image plane 470, and will not affect a focal length of the image capturing optical lens system.

The detailed optical data of the 4th embodiment are shown in Table 7, and the aspheric surface data are shown in Table 8 below.

TABLE 7

4th Embodiment
f = 3.52 mm, Fno = 2.15, HFOV = 39.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.240 | | | | |
| 2 | Lens 1 | 1.526 | (ASP) | 0.434 | Plastic | 1.544 | 55.9 | 3.78 |
| 3 | | 5.319 | (ASP) | 0.031 | | | | |
| 4 | Lens 2 | 3.101 | (ASP) | 0.220 | Plastic | 1.640 | 23.3 | −6.73 |
| 5 | | 1.753 | (ASP) | 0.267 | | | | |
| 6 | Lens 3 | 3.404 | (ASP) | 0.428 | Plastic | 1.535 | 56.3 | 17.00 |
| 7 | | 5.205 | (ASP) | 0.230 | | | | |
| 8 | Lens 4 | −27.849 | (ASP) | 0.466 | Plastic | 1.535 | 56.3 | 3.47 |
| 9 | | −1.749 | (ASP) | 0.251 | | | | |
| 10 | Lens 5 | −0.973 | (ASP) | 0.260 | Plastic | 1.640 | 23.3 | −12.30 |
| 11 | | −1.226 | (ASP) | 0.328 | | | | |
| 12 | Lens 6 | 1.860 | (ASP) | 0.628 | Plastic | 1.544 | 55.9 | −5.21 |
| 13 | | 0.990 | (ASP) | 0.500 | | | | |
| 14 | IR-cut filter | Plano | | 0.150 | Glass | 1.517 | 64.2 | — |
| 15 | | Plano | | 0.303 | | | | |
| 16 | Image | Plano | | — | | | | |

Note:
Reference wavelength (d-line) is 587.6 nm.

TABLE 8

Aspheric Coefficients

| | Surface # | | | | | |
|---|---|---|---|---|---|---|
| | 2 | 3 | 4 | 5 | 6 | 7 |
| k = | 2.7915E−01 | −2.4936E+01 | −2.7594E+01 | −5.8473E+00 | −9.8578E+00 | −2.1118E+00 |
| A4 = | 2.4313E−04 | −3.9606E−02 | −5.3828E−02 | 1.8334E−02 | −7.0035E−02 | −9.1836E−02 |
| A6 = | 3.1291E−02 | 1.5890E−01 | 1.6355E−01 | 1.1594E−01 | 2.1129E−02 | −3.2061E−04 |
| A8 = | −5.6249E−02 | −1.7755E−01 | −1.2411E−01 | 4.0035E−02 | −2.9000E−02 | −8.2744E−02 |
| A10 = | −7.1236E−03 | −4.4157E−02 | −1.8261E−01 | −2.8123E−01 | 1.9761E−02 | 2.5430E−02 |
| A12 = | 1.7068E−01 | 7.5059E−02 | 7.6292E−02 | 2.6344E−01 | −2.5108E−05 | 5.1347E−06 |
| A14 = | −1.4769E−01 | −6.9236E−02 | 2.7542E−02 | −4.5915E−02 | — | — |

| | Surface # | | | | | |
|---|---|---|---|---|---|---|
| | 8 | 9 | 10 | 11 | 12 | 13 |
| k = | −1.0000E+00 | 5.1039E−01 | −4.1329E+00 | −7.0200E−01 | −2.6121E+01 | −6.4224E+00 |
| A4 = | −1.0058E−01 | −2.9673E−02 | −9.2923E−02 | 1.4126E−01 | −1.8872E−01 | −7.1095E−02 |
| A6 = | −1.9692E−02 | −2.4332E−02 | −3.4662E−02 | −5.1905E−02 | 9.2722E−02 | 2.9091E−02 |
| A8 = | 1.7002E−02 | 2.1407E−02 | 1.7437E−01 | 1.9044E−02 | −5.8075E−02 | −1.1727E−02 |
| A10 = | −9.5874E−02 | 5.2055E−02 | −7.6455E−02 | 1.3553E−02 | 3.2738E−02 | 3.4867E−03 |
| A12 = | −3.2940E−02 | −4.6551E−03 | −1.4777E−02 | −4.4324E−03 | −1.0149E−02 | −6.6684E−04 |
| A14 = | 2.0100E−01 | −1.0881E−02 | 9.5556E−03 | −4.5447E−03 | 1.5541E−03 | 6.9187E−05 |
| A16 = | −1.0135E−01 | — | −1.7410E−03 | 1.5160E−03 | −9.3289E−05 | −2.8417E−06 |

In the image capturing optical lens system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 3.52 | R12/f2 | −0.15 |
| Fno | 2.15 | f/f4 | 1.02 |
| HFOV (deg.) | 39.0 | f/f5 | −0.29 |
| (V2 + V5)/V1 | 0.83 | (|f/f5| + |f/f6|)/(f/f4) | 0.95 |
| V5/V6 | 0.417 | CT2/tan(α) (mm) | 0.07 |
| CT5/CT6 | 0.41 | BFL/Td | 0.25 |
| (R1 + R2)/(R1 − R2) | −1.80 | ImgH/f | 0.810 |
| (R9 − R10)/(R9 + R10) | −0.12 | TTL/ImgH | 1.56 |

5th Embodiment

Figure 9:
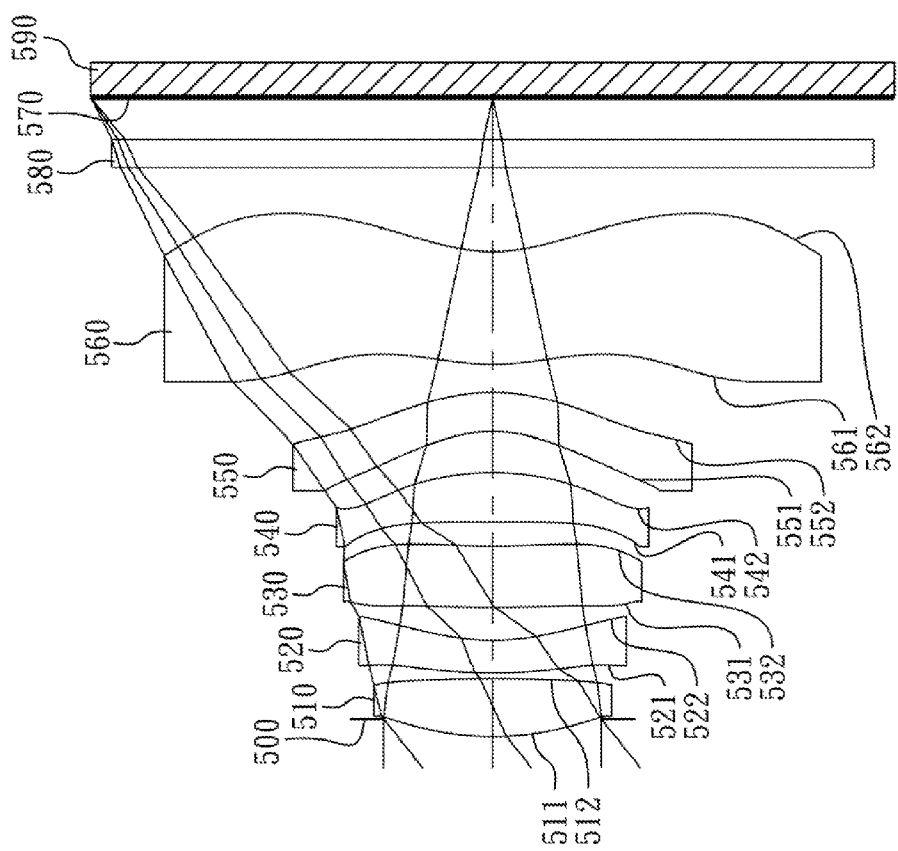
FIG. 9 is a schematic view of an image capturing optical lens system according to the 5th embodiment of the present disclosure.
Figure 10:
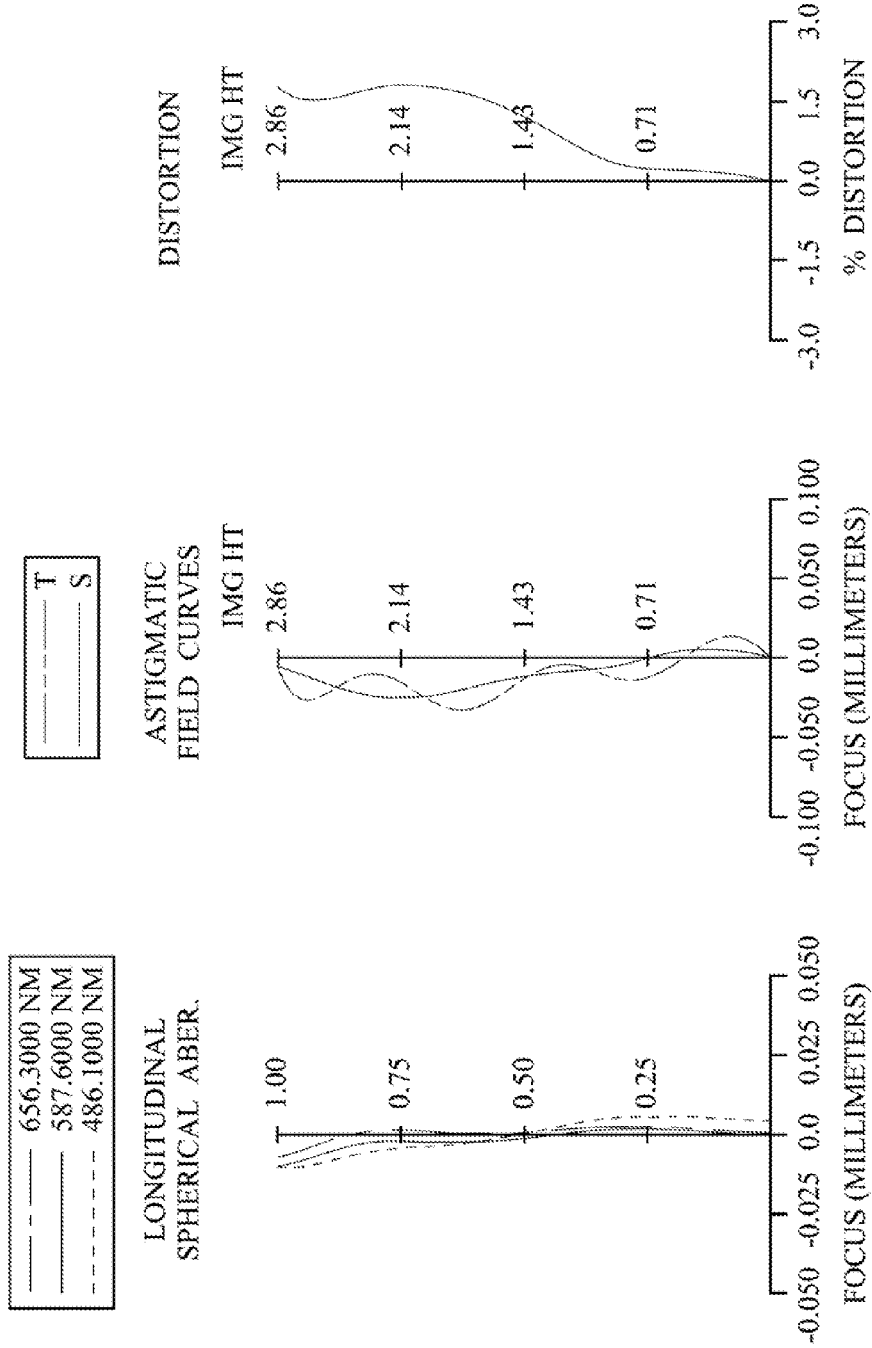
FIG. 10 shows spherical aberration curves, astigmatic field curves and a distortion curve of the image capturing optical lens system according to the 5th embodiment.

FIG. 9 is a schematic view of an image capturing optical lens system according to the 5th embodiment of the present disclosure. FIG. 10 shows spherical aberration curves, astigmatic field curves and a distortion curve of the image capturing optical lens system according to the 5th embodiment. In FIG. 9, the image capturing optical lens system includes, in order from an object side to an image side, an aperture stop 500, a first lens element 510, a second lens element 520, a third lens element 530, a fourth lens element 540, a fifth lens element 550, a sixth lens element 560, an IR-cut filter 580, an image plane 570, and an image sensor 590.

The first lens element 510 with positive refractive power has an object-side surface 511 being convex at a paraxial region thereof and an image-side surface 512 being convex at a paraxial region thereof. The first lens element 510 is made of plastic material and has the object-side surface 511 and the image-side surface 512 being both aspheric.

The second lens element 520 with negative refractive power has an object-side surface 521 being convex at a paraxial region thereof and an image-side surface 522 being concave at a paraxial region thereof. The second lens element 520 is made of plastic material and has the object-side surface 521 and the image-side surface 522 being both aspheric.

The third lens element 530 with negative refractive power has an object-side surface 531 being convex at a paraxial region thereof and an image-side surface 532 being concave at a paraxial region thereof. The third lens element 530 is made of plastic material and has the object-side surface 531 and the image-side surface 532 being both aspheric.

The fourth lens element 540 with positive refractive power has an object-side surface 541 being convex at a paraxial region thereof and an image-side surface 542 being convex at a paraxial region thereof. The fourth lens element 540 is made of plastic material and has the object-side surface 541 and the image-side surface 542 being both aspheric.

The fifth lens element 550 with negative refractive power has an object-side surface 551 being concave at a paraxial region thereof and an image-side surface 552 being convex at a paraxial region thereof. The fifth lens element 550 is made of plastic material and has the object-side surface 551 and the image-side surface 552 being both aspheric.

The sixth lens element 560 with negative refractive power has an object-side surface 561 being convex at a paraxial region thereof and an image-side surface 562 changing from concave at a paraxial region thereof to convex at a peripheral region thereof. The sixth lens element 560 is made of plastic material and has the object-side surface 561 and the image-side surface 562 being both aspheric.

The IR-cut filter 580 made of glass material is located between the sixth lens element 560 and the image plane 570, and will not affect a focal length of the image capturing optical lens system.

The detailed optical data of the 5th embodiment are shown in Table 9, and the aspheric surface data are shown in Table 10 below.

TABLE 9

5th Embodiment
f = 3.53 mm, Fno = 2.28, HFOV = 38.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.125 | | | | |
| 2 | Lens 1 | 2.098 | (ASP) | 0.412 | Plastic | 1.570 | 57.5 | 3.07 |
| 3 | | −9.769 | (ASP) | 0.040 | | | | |
| 4 | Lens 2 | 3.157 | (ASP) | 0.230 | Plastic | 1.640 | 23.3 | −5.46 |
| 5 | | 1.611 | (ASP) | 0.236 | | | | |
| 6 | Lens 3 | 7.409 | (ASP) | 0.439 | Plastic | 1.544 | 55.9 | −147.68 |
| 7 | | 6.642 | (ASP) | 0.167 | | | | |
| 8 | Lens 4 | 72.487 | (ASP) | 0.354 | Plastic | 1.544 | 55.9 | 3.62 |
| 9 | | −2.019 | (ASP) | 0.292 | | | | |
| 10 | Lens 5 | −0.951 | (ASP) | 0.280 | Plastic | 1.633 | 23.4 | −6.64 |
| 11 | | −1.369 | (ASP) | 0.199 | | | | |
| 12 | Lens 6 | 1.577 | (ASP) | 0.803 | Plastic | 1.544 | 55.9 | −20.65 |
| 13 | | 1.134 | (ASP) | 0.600 | | | | |
| 14 | IR-cut filter | Plano | | 0.200 | Glass | 1.517 | 64.2 | — |
| 15 | | Plano | | 0.300 | | | | |
| 16 | Image | Plano | | — | | | | |

Note:
Reference wavelength (d-line) is 587.6 nm.

TABLE 10

Aspheric Coefficients

| | Surface # | | | | | |
|---|---|---|---|---|---|---|
| | 2 | 3 | 4 | 5 | 6 | 7 |
| k = | −2.9182E−02 | −4.0000E+01 | −3.9740E+01 | −8.7375E+00 | −2.4782E−01 | −1.0194E+01 |
| A4 = | −6.1716E−03 | 3.7462E−03 | −3.0152E−02 | −2.1965E−02 | −1.0134E−01 | −1.0225E−01 |
| A6 = | −1.9011E−02 | 9.0896E−02 | 1.3569E−01 | 2.8108E−02 | −3.5725E−02 | −7.1141E−03 |
| A8 = | 2.5131E−02 | −2.1060E−01 | −1.8667E−01 | 7.4668E−02 | 1.1420E−01 | −7.4579E−02 |
| A10 = | −1.0473E−01 | 2.9488E−02 | −1.0551E−01 | −3.2137E−01 | 1.2721E−02 | 2.1331E−02 |
| A12 = | 1.7110E−01 | 7.3654E−02 | 7.7073E−02 | 2.6333E−01 | −1.9191E−02 | 1.2521E−02 |
| A14 = | −1.4692E−01 | −6.9236E−02 | 2.8732E−02 | −4.5979E−02 | — | — |

| | Surface # | | | | | |
|---|---|---|---|---|---|---|
| | 8 | 9 | 10 | 11 | 12 | 13 |
| k = | 0.0000E+00 | 9.0561E−01 | −5.5036E+00 | −7.1634E−01 | −1.5362E+01 | −6.1704E+00 |
| A4 = | −1.1202E−01 | −3.1565E−02 | −6.6246E−02 | 1.4768E−01 | −1.7629E−01 | −7.4355E−02 |
| A6 = | −1.0862E−02 | −2.2451E−02 | −3.0597E−02 | −5.5223E−02 | 9.2042E−02 | 3.0461E−02 |
| A8 = | −2.6754E−03 | 3.7699E−02 | 1.5841E−01 | 2.0759E−02 | −5.7974E−02 | −1.2184E−02 |
| A10 = | −8.2421E−02 | 5.9365E−02 | −8.0997E−02 | 1.3723E−02 | 3.2714E−02 | 3.5168E−03 |
| A12 = | −1.8457E−02 | −4.3189E−03 | −1.0397E−02 | −4.6091E−03 | −1.0165E−02 | −6.6148E−04 |
| A14 = | 1.8390E−01 | −7.3347E−03 | 1.2640E−02 | −4.5883E−03 | 1.5483E−03 | 6.9342E−05 |
| A16 = | −1.0137E−01 | — | −2.8705E−03 | 1.5255E−03 | −9.1738E−05 | −2.9676E−06 |

In the image capturing optical lens system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 3.53 | R12/f2 | −0.21 |
| Fno | 2.28 | f/f4 | 0.98 |
| HFOV (deg.) | 38.5 | f/f5 | −0.53 |
| (V2 + V5)/V1 | 0.81 | (|f/f5| + |f/f6|)/(f/f4) | 0.72 |
| V5/V6 | 0.419 | CT2/tan(α) (mm) | 0.07 |
| CT5/CT6 | 0.35 | BFL/Td | 0.30 |
| (R1 + R2)/(R1 − R2) | −0.65 | ImgH/f | 0.809 |
| (R9 − R10)/(R9 + R10) | −0.18 | TTL/ImgH | 1.57 |

6th Embodiment

Figure 11:
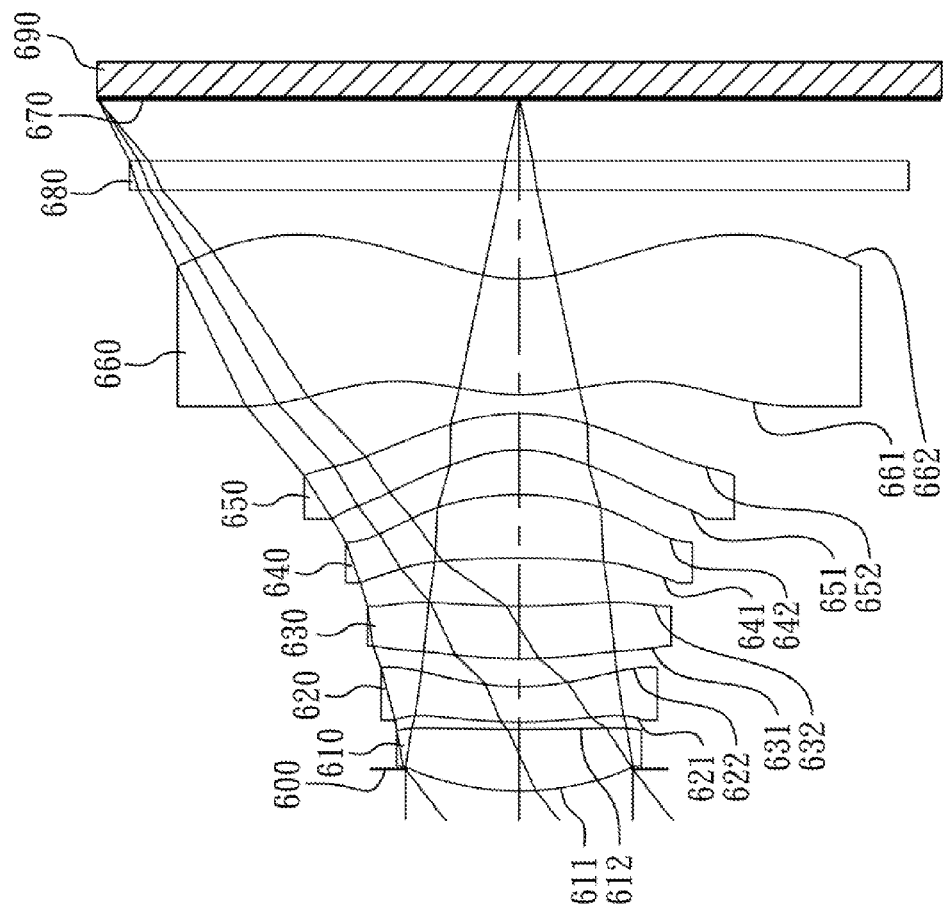
FIG. 11 is a schematic view of an image capturing optical lens system according to the 6th embodiment of the present disclosure.
Figure 12:
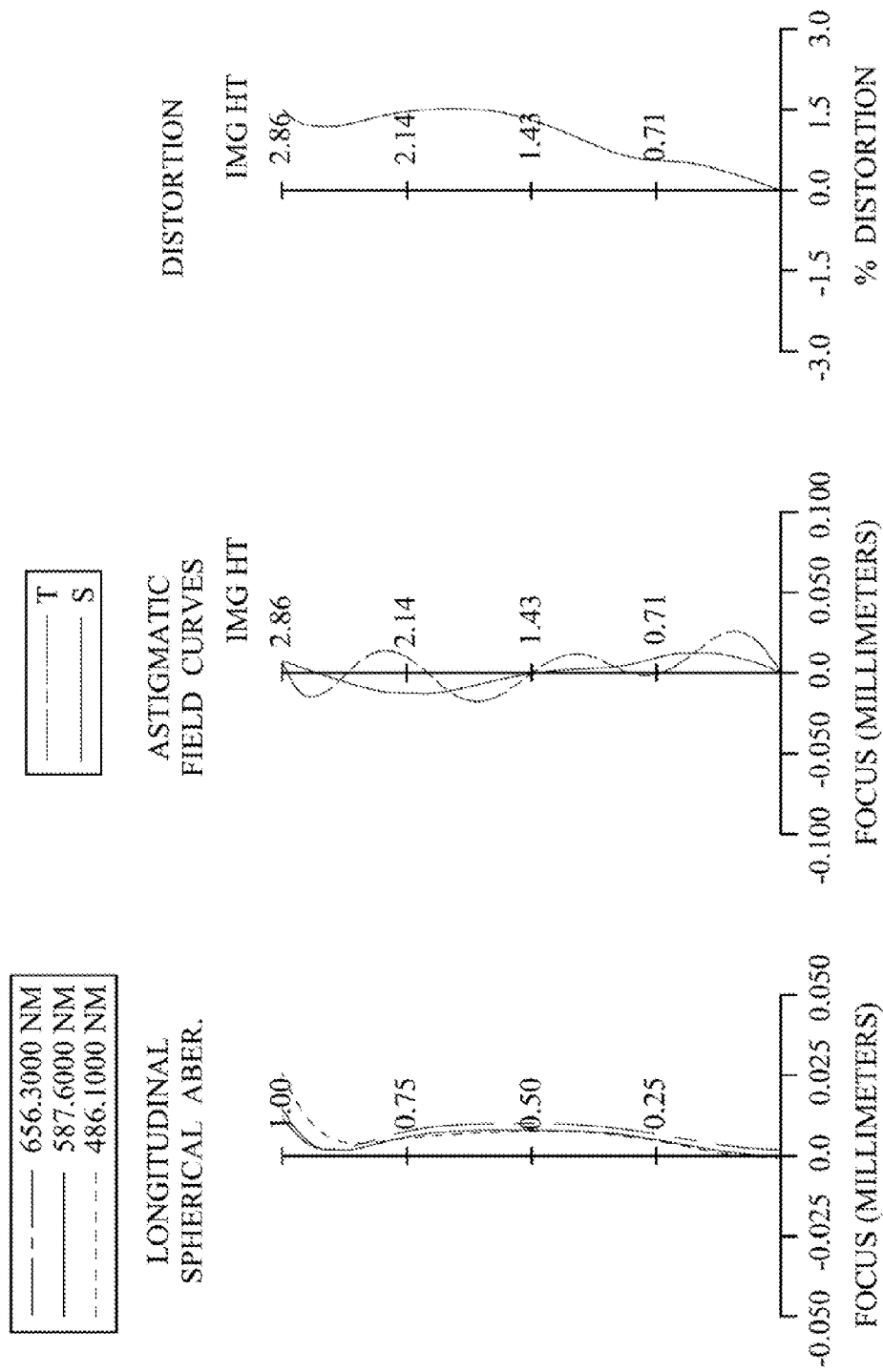
FIG. 12 shows spherical aberration curves, astigmatic field curves and a distortion curve of the image capturing optical lens system according to the 6th embodiment.

FIG. 11 is a schematic view of an image capturing optical lens system according to the 6th embodiment of the present disclosure. FIG. 12 shows spherical aberration curves, astigmatic field curves and a distortion curve of the image capturing optical lens system according to the 6th embodiment. In FIG. 11, the image capturing optical lens system includes, in order from an object side to an image side, an aperture stop 600, a first lens element 610, a second lens element 620, a third lens element 630, a fourth lens element 640, a fifth lens element 650, a sixth lens element 660, an IR-cut filter 680, an image plane 670, and an image sensor 690.

The first lens element 610 with positive refractive power has an object-side surface 611 being convex at a paraxial region thereof and an image-side surface 612 being concave at a paraxial region thereof. The first lens element 610 is made of plastic material and has the object-side surface 611 and the image-side surface 612 being both aspheric.

The second lens element 620 with negative refractive power has an object-side surface 621 being convex at a paraxial region thereof and an image-side surface 622 being concave at a paraxial region thereof. The second lens element 620 is made of plastic material and has the object-side surface 621 and the image-side surface 622 being both aspheric.

The third lens element 630 with positive refractive power has an object-side surface 631 being convex at a paraxial region thereof and an image-side surface 632 being concave at a paraxial region thereof. The third lens element 630 is made of plastic material and has the object-side surface 631 and the image-side surface 632 being both aspheric.

The fourth lens element 640 with positive refractive power has an object-side surface 641 being concave at a paraxial region thereof and an image-side surface 642 being convex at a paraxial region thereof. The fourth lens element 640 is made of plastic material and has the object-side surface 641 and the image-side surface 642 being both aspheric.

The fifth lens element 650 with negative refractive power has an object-side surface 651 being concave at a paraxial region thereof and an image-side surface 652 being convex at a paraxial region thereof. The fifth lens element 650 is made of plastic material and has the object-side surface 651 and the image-side surface 652 being both aspheric.

The sixth lens element 660 with positive refractive power has an object-side surface 661 being convex at a paraxial region thereof and an image-side surface 662 changing from concave at a paraxial region thereof to convex at a peripheral region thereof. The sixth lens element 660 is made of plastic material and has the object-side surface 661 and the image-side surface 662 being both aspheric.

The IR-cut filter 680 made of glass material is located between the sixth lens element 660 and the image plane 670, and will not affect a focal length of the image capturing optical lens system.

The detailed optical data of the 6th embodiment are shown in Table 11, and the aspheric surface data are shown in Table 12 below.

TABLE 11

6th Embodiment
f = 3.62 mm, Fno = 2.35, HFOV = 37.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.148 | | | | |
| 2 | Lens 1 | 1.962 | (ASP) | 0.418 | Plastic | 1.544 | 55.9 | 4.11 |
| 3 | | 14.881 | (ASP) | 0.050 | | | | |
| 4 | Lens 2 | 2.961 | (ASP) | 0.240 | Plastic | 1.640 | 23.3 | −6.66 |
| 5 | | 1.692 | (ASP) | 0.185 | | | | |
| 6 | Lens 3 | 3.007 | (ASP) | 0.362 | Plastic | 1.544 | 55.9 | 14.05 |
| 7 | | 4.745 | (ASP) | 0.321 | | | | |
| 8 | Lens 4 | −12.116 | (ASP) | 0.435 | Plastic | 1.544 | 55.9 | 4.08 |
| 9 | | −1.900 | (ASP) | 0.300 | | | | |
| 10 | Lens 5 | −0.916 | (ASP) | 0.250 | Plastic | 1.640 | 23.3 | −5.53 |
| 11 | | −1.367 | (ASP) | 0.128 | | | | |
| 12 | Lens 6 | 1.310 | (ASP) | 0.787 | Plastic | 1.530 | 55.8 | 70.78 |
| 13 | | 1.075 | (ASP) | 0.600 | | | | |
| 14 | IR-cut filter | Plano | | 0.200 | Glass | 1.517 | 64.2 | — |
| 15 | | Plano | | 0.426 | | | | |
| 16 | Image | Plano | | — | | | | |

Note:
Reference wavelength (d-line) is 587.6 nm.

TABLE 12

Aspheric Coefficients

| Surface # | | | | | |
|---|---|---|---|---|---|
| 2 | 3 | 4 | 5 | 6 | 7 |
| k = 4.6664E−01 | −4.0000E+01 | −3.0098E+01 | −7.5608E+00 | −4.8799E+00 | 1.9273E+00 |
| A4 = −2.1799E−04 | −5.3426E−02 | −6.9007E−02 | −3.8393E−02 | −9.5062E−02 | −9.2795E−02 |
| A6 = 1.3945E−02 | 1.7055E−01 | 6.3894E−02 | 9.3340E−03 | −3.7983E−02 | −3.5163E−02 |
| A8 = 5.2083E−04 | −2.5636E−01 | −6.9036E−02 | 7.0595E−02 | 7.2989E−02 | −6.9952E−02 |
| A10 = −7.4073E−02 | −3.8467E−02 | −3.1084E−01 | −3.5385E−01 | −1.9872E−02 | 5.1614E−02 |
| A12 = 1.7110E−01 | 7.3654E−02 | 7.7073E−02 | 2.6333E−01 | 1.8507E−02 | 3.6115E−02 |
| A14 = −1.4692E−01 | −6.9236E−02 | 2.8732E−02 | −4.5979E−02 | — | — |

| Surface # | | | | | |
|---|---|---|---|---|---|
| 8 | 9 | 10 | 11 | 12 | 13 |
| k = −1.0000E+00 | 1.0135E+00 | −6.1714E+00 | −6.3844E−01 | −1.2851E+01 | −5.3345E+00 |
| A4 = −8.7034E−02 | −4.5830E−02 | −1.0529E−01 | 1.3602E−01 | −1.7692E−01 | −8.0147E−02 |
| A6 = −2.2875E−02 | −4.7613E−03 | −2.1382E−02 | −6.0425E−02 | 9.2596E−02 | 3.3015E−02 |
| A8 = 2.4491E−02 | 3.7893E−02 | 1.6663E−01 | 2.3794E−02 | −5.8046E−02 | −1.2613E−02 |
| A10 = −7.1043E−02 | 5.4155E−02 | −7.8022E−02 | 1.4800E−02 | 3.2694E−02 | 3.5304E−03 |
| A12 = −2.0087E−02 | −6.8905E−03 | −1.2281E−02 | −4.3372E−03 | −1.0164E−02 | −6.5395E−04 |

TABLE 12-continued

| Aspheric Coefficients | | | | | | |
|---|---|---|---|---|---|---|
| A14 = | 1.8513E−01 | −1.0180E−02 | 1.1470E−02 | −4.6163E−03 | 1.5482E−03 | 6.9323E−05 |
| A16 = | −1.0137E−01 | — | −1.7129E−03 | 1.4470E−03 | −9.1665E−05 | −3.0797E−06 |

In the image capturing optical lens system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 3.62 | R12/f2 | −0.16 |
| Fno | 2.35 | f/f4 | 0.89 |
| HFOV (deg.) | 37.8 | f/f5 | −0.65 |
| (V2 + V5)/V1 | 0.83 | (|f/f5| + |f/f6|)/(f/f4) | 0.80 |
| V5/V6 | 0.418 | CT2/tan(α) (mm) | 0.07 |
| CT5/CT6 | 0.32 | BFL/Td | 0.33 |
| (R1 + R2)/(R1 − R2) | −1.30 | ImgH/f | 0.789 |
| (R9 − R10)/(R9 + R10) | −0.20 | TTL/ImgH | 1.62 |

7th Embodiment

Figure 13:
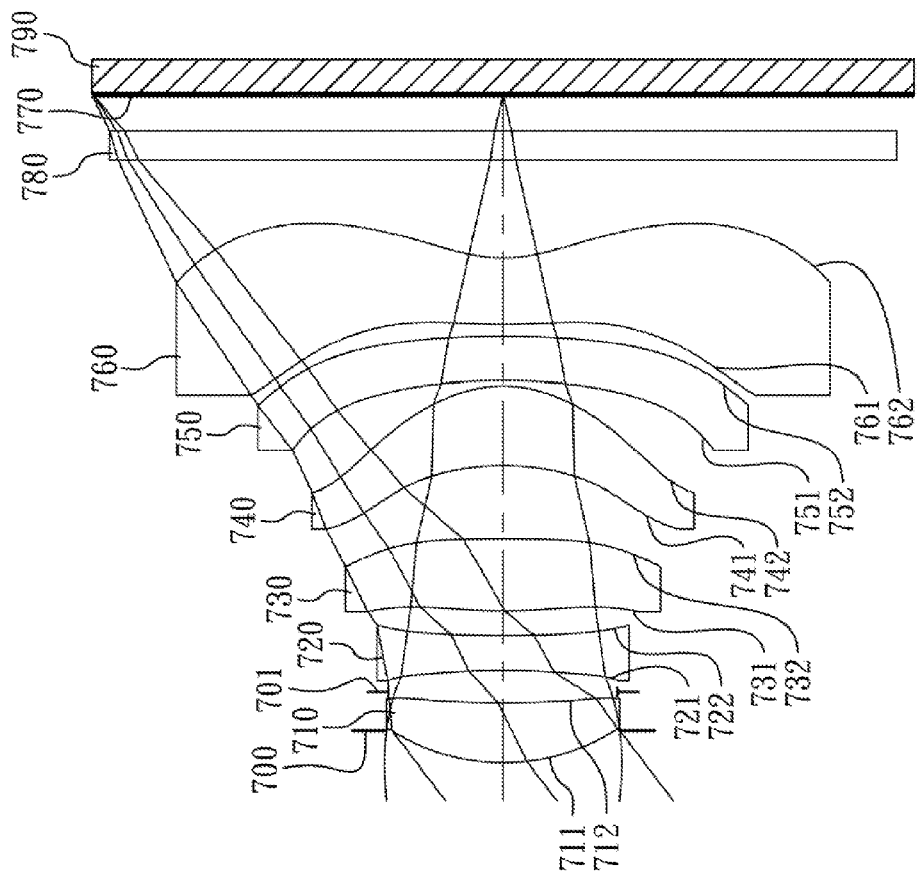
FIG. 13 is a schematic view of an image capturing optical lens system according to the 7th embodiment of the present disclosure.
Figure 14:
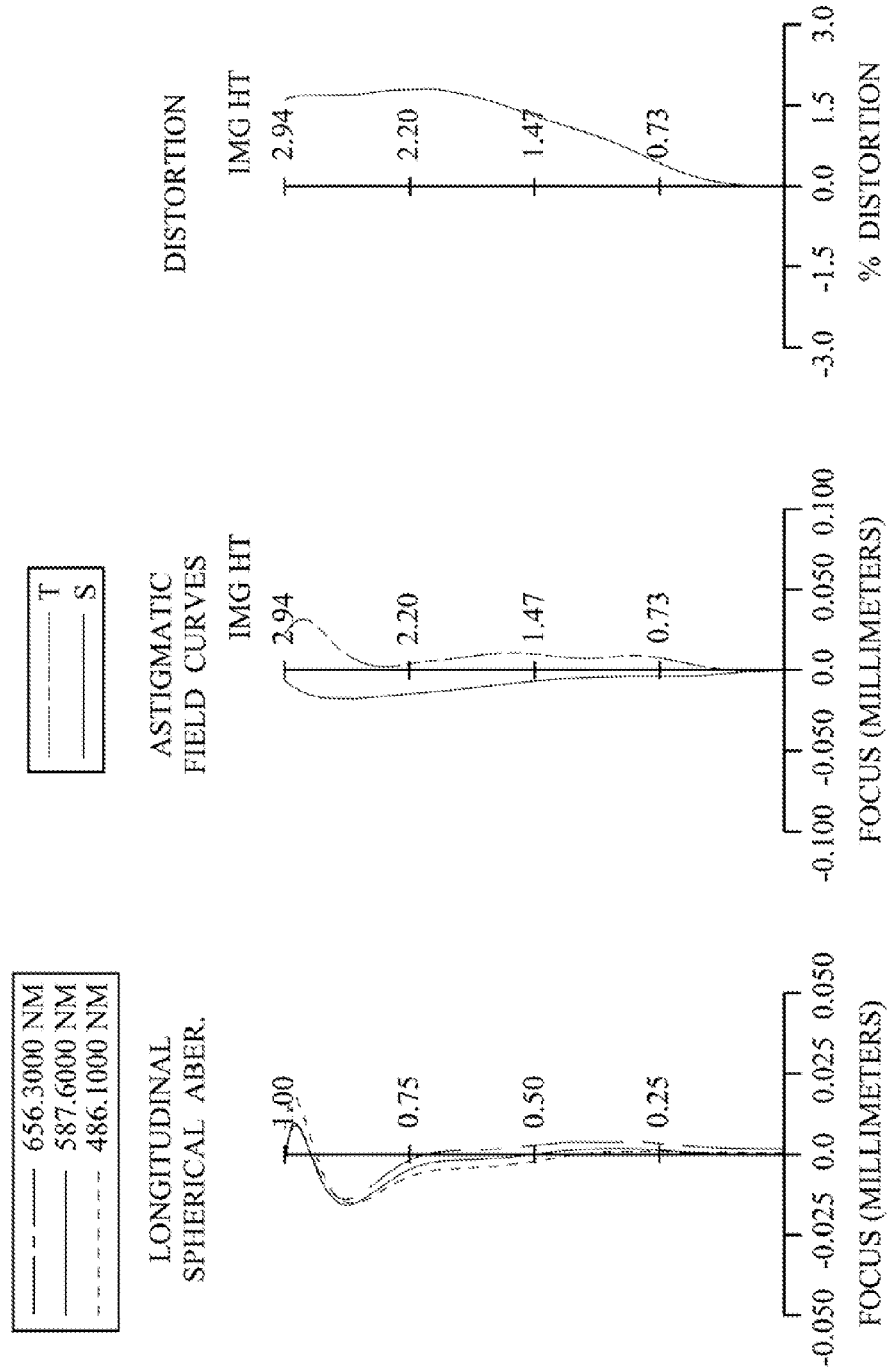
FIG. 14 shows spherical aberration curves, astigmatic field curves and a distortion curve of the image capturing optical lens system according to the 7th embodiment.

FIG. 13 is a schematic view of an image capturing optical lens system according to the 7th embodiment of the present disclosure. FIG. 14 shows spherical aberration curves, astigmatic field curves and a distortion curve of the image capturing optical lens system according to the 7th embodiment. In FIG. 13, the image capturing optical lens system includes, in order from an object side to an image side, an aperture stop 700, a first lens element 710, a stop 701, a second lens element 720, a third lens element 730, a fourth lens element 740, a fifth lens element 750, a sixth lens element 760, an IR-cut filter 780, an image plane 770, and an image sensor 790.

The first lens element 710 with positive refractive power has an object-side surface 711 being convex at a paraxial region thereof and an image-side surface 712 being concave at a paraxial region thereof. The first lens element 710 is made of plastic material and has the object-side surface 711 and the image-side surface 712 being both aspheric.

The second lens element 720 with negative refractive power has an object-side surface 721 being concave at a paraxial region thereof and an image-side surface 722 being concave at a paraxial region thereof. The second lens element 720 is made of plastic material and has the object-side surface 721 and the image-side surface 722 being both aspheric.

The third lens element 730 with positive refractive power has an object-side surface 731 being convex at a paraxial region thereof and an image-side surface 732 being convex at a paraxial region thereof. The third lens element 730 is made of plastic material and has the object-side surface 731 and the image-side surface 732 being both aspheric.

The fourth lens element 740 with positive refractive power has an object-side surface 741 being concave at a paraxial region thereof and an image-side surface 742 being convex at a paraxial region thereof. The fourth lens element 740 is made of plastic material and has the object-side surface 741 and the image-side surface 742 being both aspheric.

The fifth lens element 750 with negative refractive power has an object-side surface 751 being concave at a paraxial region thereof and an image-side surface 752 being convex at a paraxial region thereof. The fifth lens element 750 is made of plastic material and has the object-side surface 751 and the image-side surface 752 being both aspheric.

The sixth lens element 760 with negative refractive power has an object-side surface 761 being convex at a paraxial region thereof and an image-side surface 762 changing from concave at a paraxial region thereof to convex at a peripheral region thereof. The sixth lens element 760 is made of plastic material and has the object-side surface 761 and the image-side surface 762 being both aspheric.

The IR-cut filter 780 made of glass material is located between the sixth lens element 760 and the image plane 770, and will not affect a focal length of the image capturing optical lens system.

The detailed optical data of the 7th embodiment are shown in Table 13, and the aspheric surface data are shown in Table 14 below.

TABLE 13

7th Embodiment
f = 3.75 mm, Fno = 2.25, HFOV = 37.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.230 | | | | |
| 2 | Lens 1 | 1.551 | (ASP) | 0.432 | Plastic | 1.544 | 55.9 | 3.47 |
| 3 | | 7.794 | (ASP) | 0.078 | | | | |
| 4 | Stop | Plano | | 0.154 | | | | |
| 5 | Lens 2 | −5.031 | (ASP) | 0.250 | Plastic | 1.640 | 23.3 | −4.99 |
| 6 | | 8.923 | (ASP) | 0.178 | | | | |
| 7 | Lens 3 | 3.714 | (ASP) | 0.514 | Plastic | 1.544 | 55.9 | 5.81 |
| 8 | | −20.315 | (ASP) | 0.522 | | | | |
| 9 | Lens 4 | −1.856 | (ASP) | 0.572 | Plastic | 1.544 | 55.9 | 2.76 |
| 10 | | −0.920 | (ASP) | 0.039 | | | | |
| 11 | Lens 5 | −4.324 | (ASP) | 0.318 | Plastic | 1.640 | 23.3 | −17.02 |
| 12 | | −7.378 | (ASP) | 0.086 | | | | |
| 13 | Lens 6 | 4.222 | (ASP) | 0.472 | Plastic | 1.535 | 56.3 | −2.57 |
| 14 | | 0.996 | (ASP) | 0.700 | | | | |

TABLE 13-continued

7th Embodiment
f = 3.75 mm, Fno = 2.25, HFOV = 37.6 deg.

| Surface # | | Curvature Radius | Thickness | Material | Index | Abbe # | Focal length |
|---|---|---|---|---|---|---|---|
| 15 | IR-cut filter | Plano | 0.210 | Glass | 1.517 | 64.2 | — |
| 16 | | Plano | 0.263 | | | | |
| 17 | Image | Plano | — | | | | |

Note:
Reference wavelength (d-line) is 587.6 nm.
Half of the diameter of the stop at Surface 4 is 0.82 mm.

TABLE 14

Aspheric Coefficients

| | Surface # | | | | | |
|---|---|---|---|---|---|---|
| | 2 | 3 | 5 | 6 | 7 | 8 |
| k = | −4.4079E−02 | 5.0000E+01 | −1.0643E+00 | −8.4921E+01 | −1.3118E+00 | 1.0000E+00 |
| A4 = | 1.7490E−02 | 9.4783E−04 | 2.2373E−02 | −4.9248E−02 | −2.3211E−01 | −1.1809E−01 |
| A6 = | 4.9271E−03 | 5.8422E−02 | 2.4605E−01 | 4.5161E−01 | 2.6588E−01 | −1.7947E−02 |
| A8 = | 1.2641E−01 | −2.9751E−01 | −9.9335E−01 | −1.0749E+00 | −4.8494E−01 | 1.8494E−02 |
| A10 = | −5.1819E−01 | 6.3338E−01 | 2.0612E+00 | 1.7513E+00 | 6.2343E−01 | −2.3733E−03 |
| A12 = | 9.3670E−01 | −8.8581E−01 | −2.6879E+00 | −1.7291E+00 | −4.7955E−01 | 3.4599E−03 |
| A14 = | −6.4751E−01 | 2.6447E−01 | 1.2659E+00 | 7.3759E−01 | 1.5910E−01 | — |

| | 9 | 10 | 11 | 12 | 13 | 14 |
|---|---|---|---|---|---|---|
| k = | −5.7148E−01 | −1.0341E+00 | −1.2747E+00 | −8.2998E+00 | −8.4741E+01 | −5.1944E+00 |
| A4 = | −4.0590E−02 | 1.2497E−01 | −9.6189E−03 | −2.0558E−02 | −1.5776E−01 | −1.3667E−01 |
| A6 = | −1.2965E−01 | −2.0774E−01 | −6.6101E−03 | −3.2392E−03 | −9.1813E−03 | 7.4540E−02 |
| A8 = | −6.9615E−03 | 1.0877E−01 | −1.9492E−03 | −8.0848E−04 | 9.8789E−02 | −2.8848E−02 |
| A10 = | 2.6027E−01 | 2.0113E−02 | −8.6543E−04 | −3.8551E−05 | −7.7556E−02 | 7.2957E−03 |
| A12 = | −1.7903E−01 | −1.9185E−02 | −5.6726E−05 | 8.0891E−05 | 2.7755E−02 | −1.2091E−03 |
| A14 = | 3.5718E−02 | 2.3228E−03 | — | — | −4.7500E−03 | 1.1933E−04 |
| A16 = | — | — | — | — | 3.1387E−04 | −5.2507E−06 |

In the image capturing optical lens system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| f (mm) | 3.75 | R12/f2 | −0.20 |
|---|---|---|---|
| Fno | 2.25 | f/f4 | 1.36 |
| HFOV (deg.) | 37.6 | f/f5 | −0.22 |
| (V2 + V5)/V1 | 0.83 | (|f/f5| + |f/f6|)/(f/f4) | 1.23 |
| V5/V6 | 0.414 | CT2/tan(α) (mm) | 0.07 |
| CT5/CT6 | 0.67 | BFL/Td | 0.31 |
| (R1 + R2)/(R1 − R2) | −1.50 | ImgH/f | 0.782 |
| (R9 − R10)/(R9 + R10) | −0.26 | TTL/ImgH | 1.61 |

8th Embodiment

Figure 15:
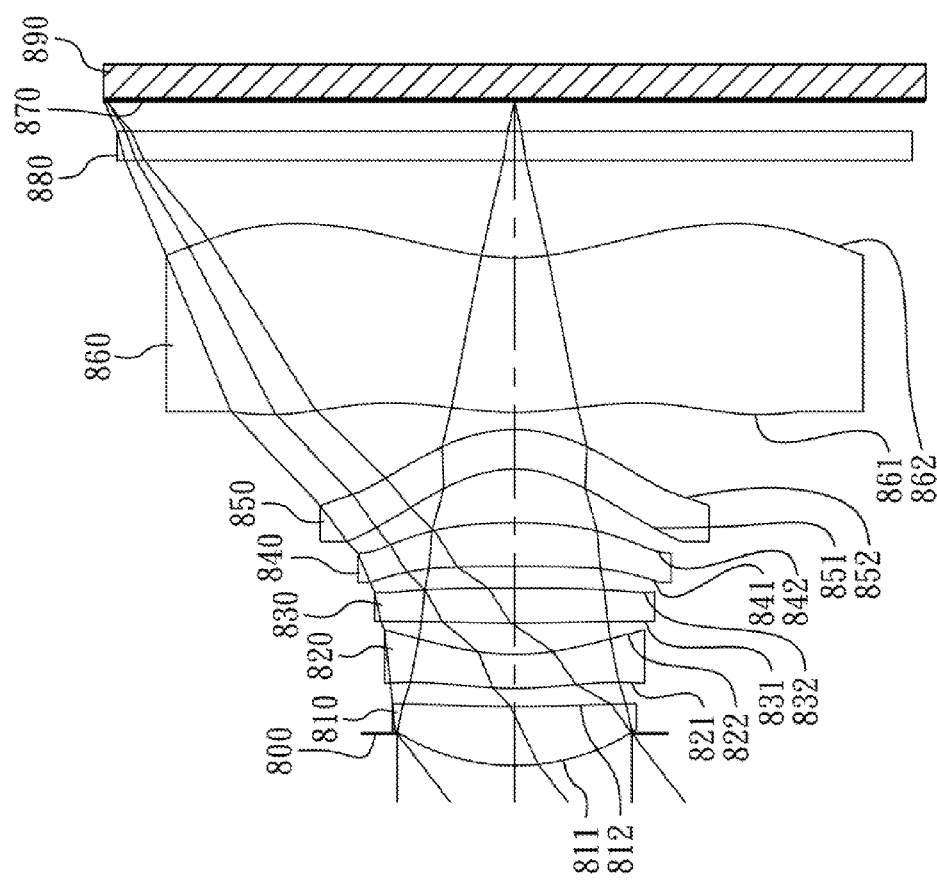
FIG. 15 is a schematic view of an image capturing optical lens system according to the 8th embodiment of the present disclosure.
Figure 16:
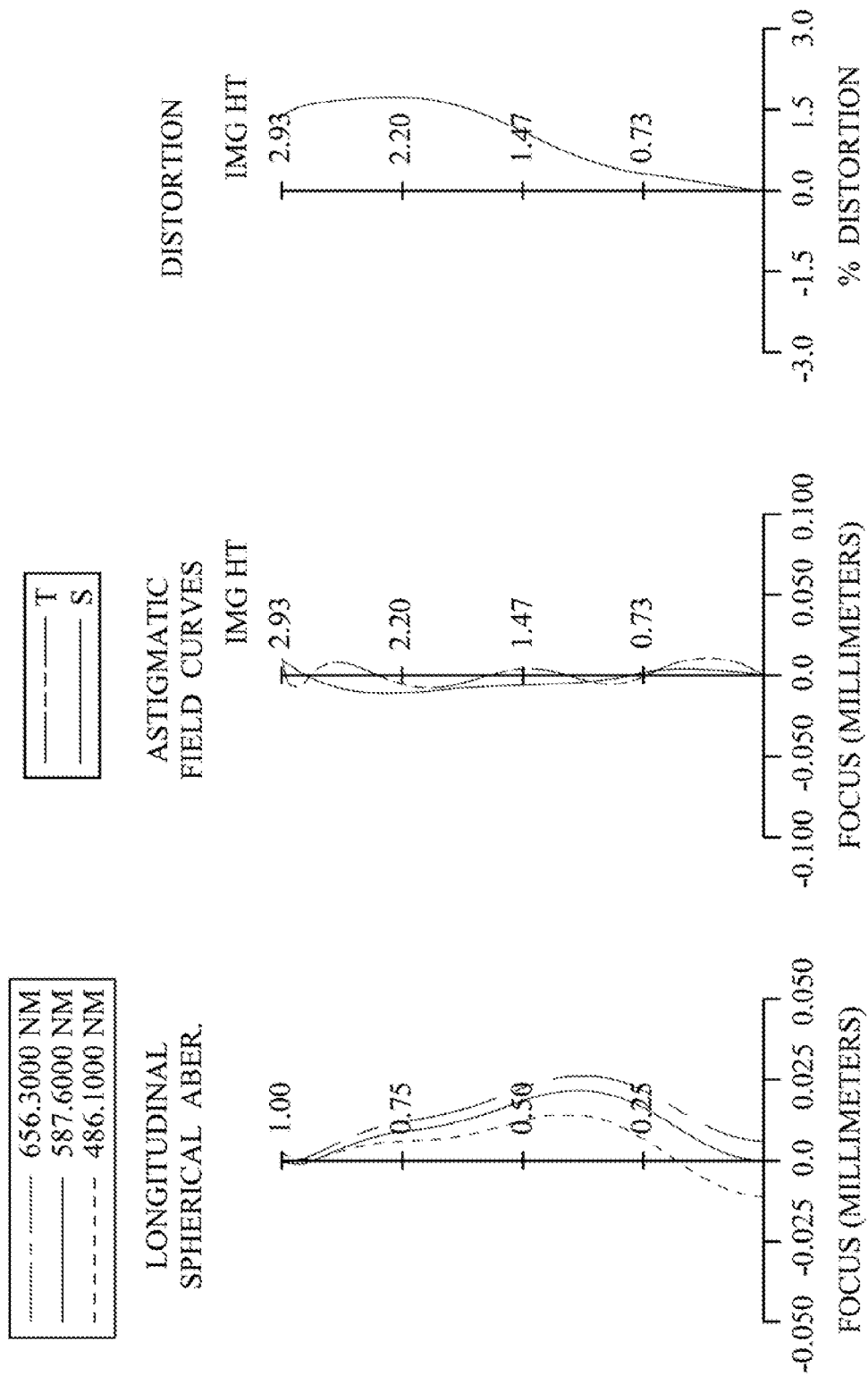
FIG. 16 shows spherical aberration curves, astigmatic field curves and a distortion curve of the image capturing optical lens system according to the 8th embodiment.

FIG. 15 is a schematic view of an image capturing optical lens system according to the 8th embodiment of the present disclosure. FIG. 16 shows spherical aberration curves, astigmatic field curves and a distortion curve of the image capturing optical lens system according to the 8th embodiment. In FIG. 15, the image capturing optical lens system includes, in order from an object side to an image side, an aperture stop 800, a first lens element 810, a second lens element 820, a third lens element 830, a fourth lens element 840, a fifth lens element 850, a sixth lens element 860, an IR-cut filter 880, an image plane 870, and an image sensor 890.

The first lens element 810 with positive refractive power has an object-side surface 811 being convex at a paraxial region thereof and an image-side surface 812 being concave at a paraxial region thereof. The first lens element 810 is made of plastic material and has the object-side surface 811 and the image-side surface 812 being both aspheric.

The second lens element 820 with negative refractive power has an object-side surface 821 being convex at a paraxial region thereof and an image-side surface 822 being concave at a paraxial region thereof. The second lens element 820 is made of plastic material and has the object-side surface 821 and the image-side surface 822 being both aspheric.

The third lens element 830 with positive refractive power has an object-side surface 831 being convex at a paraxial region thereof and an image-side surface 832 being convex at a paraxial region thereof. The third lens element 830 is made of plastic material and has the object-side surface 831 and the image-side surface 832 being both aspheric.

The fourth lens element 840 with positive refractive power has an object-side surface 841 being convex at a paraxial region thereof and an image-side surface 842 being convex at a paraxial region thereof. The fourth lens element 840 is made of plastic material and has the object-side surface 841 and the image-side surface 842 being both aspheric.

The fifth lens element 850 with negative refractive power has an object-side surface 851 being concave at a paraxial region thereof and an image-side surface 852 being convex at a paraxial region thereof. The fifth lens element 850 is made of plastic material and has the object-side surface 851 and the image-side surface 852 being both aspheric.

The sixth lens element 860 with positive refractive power has an object-side surface 861 being convex at a paraxial region thereof and an image-side surface 862 changing from concave at a paraxial region thereof to convex at a peripheral region thereof. The sixth lens element 860 is made of plastic material and has the object-side surface 861 and the image-side surface 862 being both aspheric.

The IR-cut filter 880 made of glass material is located between the sixth lens element 860 and the image plane 870, and will not affect a focal length of the image capturing optical lens system.

The detailed optical data of the 8th embodiment are shown in Table 15, and the aspheric surface data are shown in Table 16 below.

In the image capturing optical lens system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 3.75 | R12/f2 | −0.23 |
| Fno | 2.22 | f/f4 | 0.62 |
| HFOV (deg.) | 37.6 | f/f5 | −0.40 |
| (V2 + V5)/V1 | 0.83 | (|f/f5| + |f/f6|)/(f/f4) | 0.67 |
| V5/V6 | 0.417 | CT2/tan(α) (mm) | 0.06 |
| CT5/CT6 | 0.25 | BFL/Td | 0.29 |
| (R1 + R2)/(R1 − R2) | −1.51 | ImgH/f | 0.783 |
| (R9 − R10)/(R9 + R10) | −0.14 | TTL/ImgH | 1.61 |

TABLE 15

8th Embodiment
f = 3.75 mm, Fno = 2.22, HFOV = 37.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.230 | | | | |
| 2 | Lens 1 | 1.634 | (ASP) | 0.422 | Plastic | 1.544 | 55.9 | 3.69 |
| 3 | | 7.993 | (ASP) | 0.133 | | | | |
| 4 | Lens 2 | 2.740 | (ASP) | 0.240 | Plastic | 1.640 | 23.3 | −7.05 |
| 5 | | 1.646 | (ASP) | 0.230 | | | | |
| 6 | Lens 3 | 14.616 | (ASP) | 0.250 | Plastic | 1.544 | 55.9 | 23.00 |
| 7 | | −86.443 | (ASP) | 0.156 | | | | |
| 8 | Lens 4 | 100.000 | (ASP) | 0.312 | Plastic | 1.544 | 55.9 | 6.09 |
| 9 | | −3.424 | (ASP) | 0.391 | | | | |
| 10 | Lens 5 | −0.788 | (ASP) | 0.280 | Plastic | 1.640 | 23.3 | −9.25 |
| 11 | | −1.036 | (ASP) | 0.123 | | | | |
| 12 | Lens 6 | 2.018 | (ASP) | 1.116 | Plastic | 1.544 | 55.9 | 503.03 |
| 13 | | 1.636 | (ASP) | 0.700 | | | | |
| 14 | IR-cut filter | Plano | | 0.210 | Glass | 1.517 | 64.2 | — |
| 15 | | Plano | | 0.226 | | | | |
| 16 | Image | Plano | | — | | | | |

Note:
Reference wavelength (d-line) is 587.6 nm.

TABLE 16

Aspheric Coefficients

| | Surface # | | | | | |
|---|---|---|---|---|---|---|
| | 2 | 3 | 4 | 5 | 6 | 7 |
| k = | −2.7168E−02 | −6.8822E+01 | −3.2439E+01 | −8.8020E+00 | −8.9828E+01 | 1.0000E+00 |
| A4 = | 4.4163E−03 | −8.0677E−02 | −1.2812E−01 | −1.9572E−02 | −2.3676E−02 | −4.1131E−02 |
| A6 = | 2.3039E−02 | 1.4665E−01 | 8.7887E−02 | 9.9597E−03 | −2.1991E−02 | −2.0921E−02 |
| A8 = | −1.7095E−02 | −1.1445E−01 | 1.9406E−02 | 1.1952E−01 | 2.7782E−02 | −2.2773E−03 |
| A10 = | −2.9339E−02 | −7.0578E−03 | −1.3469E−01 | −2.5090E−01 | 1.7926E−03 | 4.3882E−02 |
| A12 = | 9.9529E−02 | 4.2875E−02 | 4.4865E−02 | 1.5331E−01 | −5.6449E−05 | −1.1873E−05 |
| A14 = | −7.7512E−02 | −3.6527E−02 | 1.5158E−02 | −2.4257E−02 | — | — |

| | Surface # | | | | | |
|---|---|---|---|---|---|---|
| | 8 | 9 | 10 | 11 | 12 | 13 |
| k = | −3.2429E+00 | 3.3303E+00 | −3.3077E+00 | −8.0426E−01 | −1.9814E+01 | −7.3813E+00 |
| A4 = | −1.0146E−01 | −4.5648E−02 | −8.1619E−02 | 1.1978E−01 | −1.2012E−01 | −5.1343E−02 |
| A6 = | −3.9893E−02 | −4.2874E−02 | −2.0633E−02 | −2.6545E−02 | 6.7400E−02 | 1.9885E−02 |
| A8 = | 2.2123E−02 | 1.9586E−02 | 1.2212E−01 | 2.4245E−02 | −4.1778E−02 | −7.8640E−03 |
| A10 = | −1.8964E−02 | 3.3795E−02 | −4.4025E−02 | 8.1061E−03 | 2.1037E−02 | 2.1725E−03 |
| A12 = | 2.0746E−02 | −2.3182E−03 | −7.9093E−03 | −3.4715E−03 | −5.8863E−03 | −3.8311E−04 |
| A14 = | 6.1208E−02 | 1.1093E−03 | 2.5948E−03 | −2.7535E−03 | 8.2483E−04 | 3.8278E−05 |
| A16 = | −4.8470E−02 | — | 4.5007E−04 | 7.1272E−04 | −4.5893E−05 | −1.6059E−06 |

9th Embodiment

Figure 17:
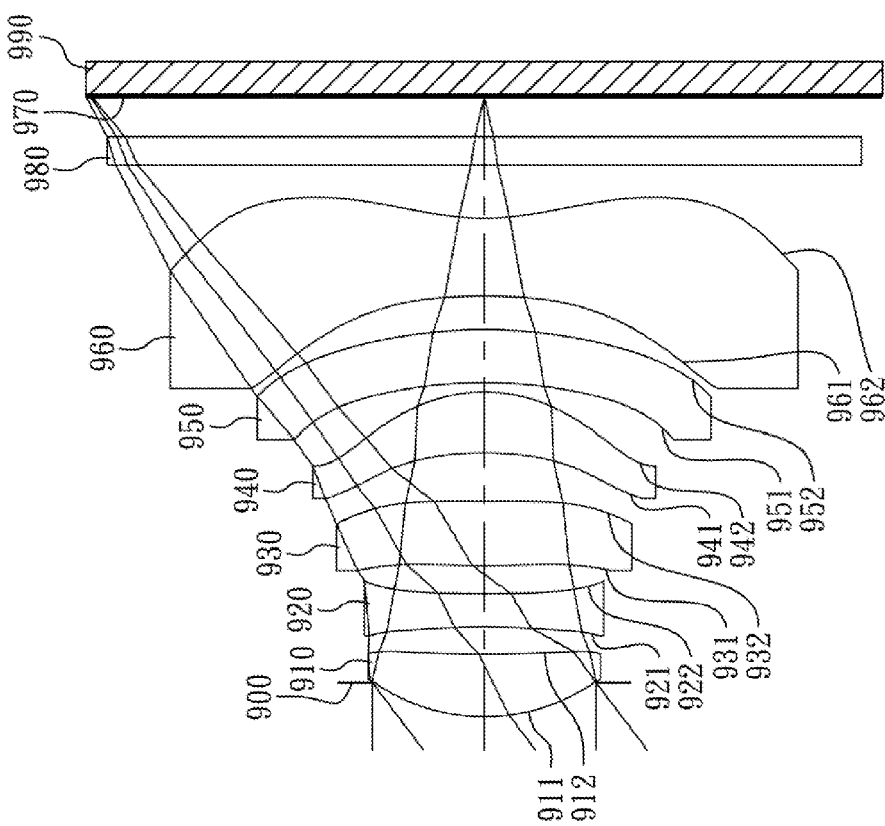
FIG. 17 is a schematic view of an image capturing optical lens system according to the 9th embodiment of the present disclosure.
Figure 18:
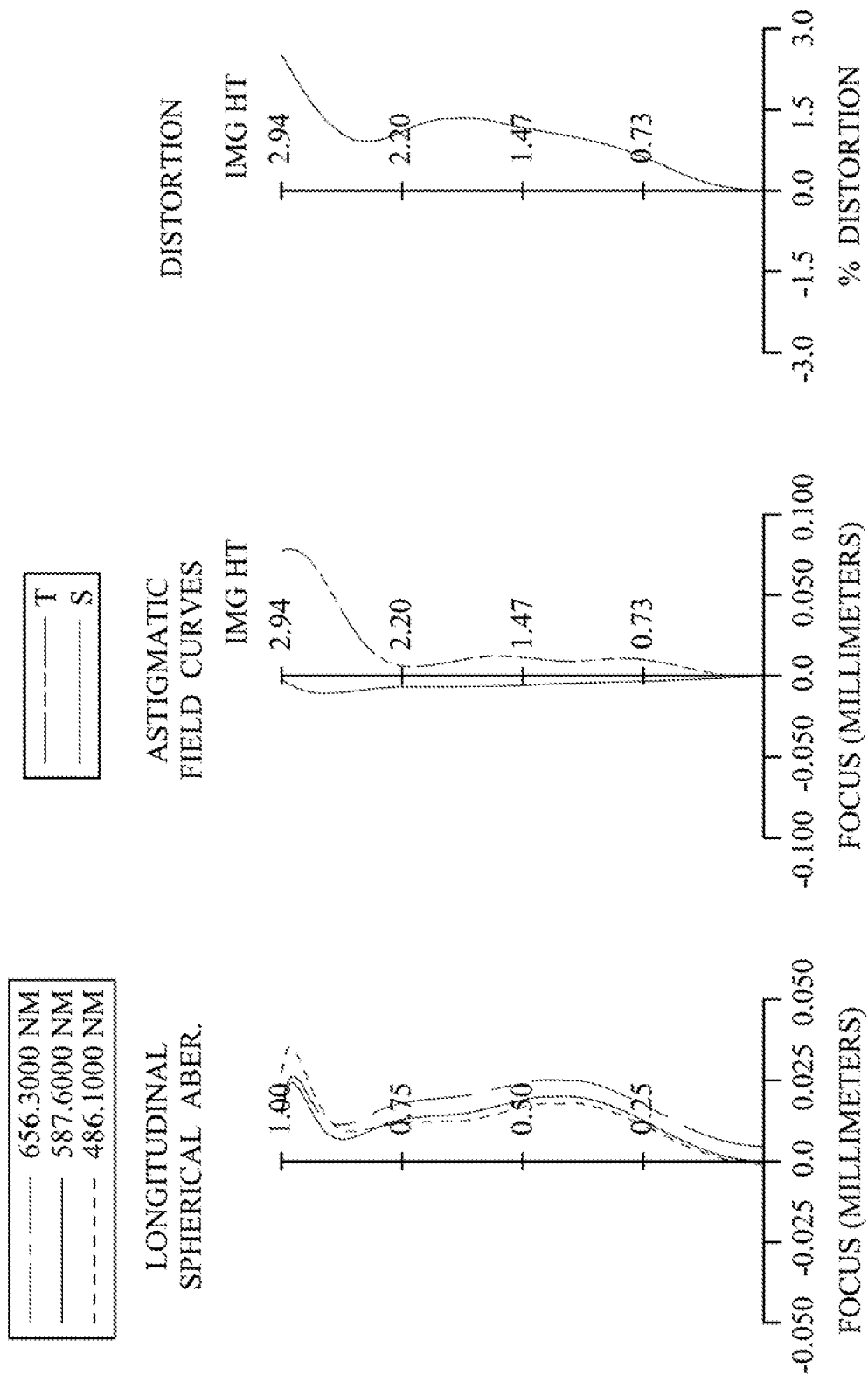
FIG. 18 shows spherical aberration curves, astigmatic field curves and a distortion curve of the image capturing optical lens system according to the 9th embodiment.

FIG. 17 is a schematic view of an image capturing optical lens system according to the 9th embodiment of the present disclosure. FIG. 18 shows spherical aberration curves, astigmatic field curves and a distortion curve of the image capturing optical lens system according to the 9th embodiment. In FIG. 17, the image capturing optical lens system includes, in order from an object side to an image side, an aperture stop 900, a first lens element 910, a second lens element 920, a third lens element 930, a fourth lens element 940, a fifth lens element 950, a sixth lens element 960, an IR-cut filter 980, an image plane 970, and an image sensor 990.

The first lens element 910 with positive refractive power has an object-side surface 911 being convex at a paraxial region thereof and an image-side surface 912 being concave at a paraxial region thereof. The first lens element 910 is made of plastic material and has the object-side surface 911 and the image-side surface 912 being both aspheric.

The second lens element 920 with negative refractive power has an object-side surface 921 being concave at a paraxial region thereof and an image-side surface 922 being concave at a paraxial region thereof. The second lens element 920 is made of plastic material and has the object-side surface 921 and the image-side surface 922 being both aspheric.

The third lens element 930 with positive refractive power has an object-side surface 931 being convex at a paraxial region thereof and an image-side surface 932 being concave at a paraxial region thereof. The third lens element 930 is made of plastic material and has the object-side surface 931 and the image-side surface 932 being both aspheric.

The fourth lens element 940 with positive refractive power has an object-side surface 941 being concave at a paraxial region thereof and an image-side surface 942 being convex at a paraxial region thereof. The fourth lens element 940 is made of plastic material and has the object-side surface 941 and the image-side surface 942 being both aspheric.

The fifth lens element 950 with negative refractive power has an object-side surface 951 being concave at a paraxial region thereof and an image-side surface 952 being convex at a paraxial region thereof. The fifth lens element 950 is made of plastic material and has the object-side surface 951 and the image-side surface 952 being both aspheric.

The sixth lens element 960 with negative refractive power has an object-side surface 961 being concave at a paraxial region thereof and an image-side surface 962 changing from concave at a paraxial region thereof to convex at a peripheral region thereof. The sixth lens element 960 is made of plastic material and has the object-side surface 961 and the image-side surface 962 being both aspheric.

The IR-cut filter 980 made of glass material is located between the sixth lens element 960 and the image plane 970, and will not affect a focal length of the image capturing optical lens system.

The detailed optical data of the 9th embodiment are shown in Table 17, and the aspheric surface data are shown in Table 18 below.

TABLE 17

9th Embodiment
f = 3.75 mm, Fno = 2.25, HFOV = 37.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.253 | | | | |
| 2 | Lens 1 | 1.472 | (ASP) | 0.467 | Plastic | 1.544 | 55.9 | 3.00 |
| 3 | | 13.066 | (ASP) | 0.198 | | | | |
| 4 | Lens 2 | −5.659 | (ASP) | 0.250 | Plastic | 1.650 | 21.4 | −5.41 |
| 5 | | 9.448 | (ASP) | 0.209 | | | | |
| 6 | Lens 3 | 5.478 | (ASP) | 0.478 | Plastic | 1.544 | 55.9 | 11.19 |
| 7 | | 53.006 | (ASP) | 0.364 | | | | |
| 8 | Lens 4 | −2.418 | (ASP) | 0.453 | Plastic | 1.544 | 55.9 | 3.22 |
| 9 | | −1.083 | (ASP) | 0.070 | | | | |
| 10 | Lens 5 | −3.228 | (ASP) | 0.394 | Plastic | 1.583 | 30.2 | −75.24 |
| 11 | | −3.641 | (ASP) | 0.247 | | | | |
| 12 | Lens 6 | −4.543 | (ASP) | 0.579 | Plastic | 1.530 | 55.8 | −2.39 |
| 13 | | 1.829 | (ASP) | 0.400 | | | | |
| 14 | IR-cut filter | Plano | | 0.210 | Glass | 1.517 | 64.2 | — |
| 15 | | Plano | | 0.305 | | | | |
| 16 | Image | Plano | | — | | | | |

Note:
Reference wavelength (d-line) is 587.6 nm.

TABLE 18

Aspheric Coefficients

| | Surface # | | | | | |
|---|---|---|---|---|---|---|
| | 2 | 3 | 4 | 5 | 6 | 7 |
| k = | −1.1941E−01 | 2.6303E+00 | −1.0000E+00 | −1.4392E+01 | −7.3165E+00 | −2.0000E+01 |
| A4 = | 6.6018E−03 | 3.8742E−03 | 6.5278E−03 | −4.8042E−02 | −2.3979E−01 | −1.3984E−01 |
| A6 = | 4.2878E−02 | 5.6943E−02 | 2.7610E−01 | 4.5649E−01 | 2.5499E−01 | −2.3033E−02 |
| A8 = | 5.1710E−02 | −3.0745E−01 | −1.0040E+00 | −1.0431E+00 | −4.7326E−01 | 3.4853E−02 |
| A10 = | −4.7087E−01 | 6.9641E−01 | 2.1186E+00 | 1.7683E+00 | 6.5137E−01 | −1.8006E−03 |
| A12 = | 9.3977E−01 | −8.8727E−01 | −2.6876E+00 | −1.7285E+00 | −4.7999E−01 | −1.6335E−03 |
| A14 = | −6.4751E−01 | 2.6447E−01 | 1.2659E+00 | 7.3759E−01 | 1.5835E−01 | — |

TABLE 18-continued

| Aspheric Coefficients | | | | | |
|---|---|---|---|---|---|
| 8 | 9 | 10 | 11 | 12 | 13 |
| k = −5.6564E−01 | −1.0158E+00 | −2.4737E+01 | −1.5837E+01 | −5.0000E+01 | −3.4499E+00 |
| A4 = −5.3796E−02 | 9.5124E−02 | −3.6509E−02 | −2.2990E−02 | −1.4338E−01 | −1.5150E−01 |
| A6 = −1.0996E−01 | −1.9462E−01 | −6.7899E−03 | 8.0124E−04 | −1.0711E−02 | 7.9095E−02 |
| A8 = −8.8751E−03 | 1.2004E−01 | 1.0570E−03 | −5.6126E−04 | 9.8961E−02 | −2.9464E−02 |
| A10 = 2.5706E−01 | 2.3369E−02 | −1.8894E−03 | 3.4463E−04 | −7.7641E−02 | 7.2539E−03 |
| A12 = −1.8086E−01 | −1.9355E−02 | 2.5699E−05 | −1.9140E−04 | 2.7727E−02 | −1.2081E−03 |
| A14 = 3.5756E−02 | 1.0974E−03 | — | — | −4.7428E−03 | 1.2009E−04 |
| A16 = — | — | — | — | 3.1657E−04 | −5.1210E−06 |

In the image capturing optical lens system according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 3.75 | R12/f2 | −0.34 |
| Fno | 2.25 | f/f4 | 1.16 |
| HFOV (deg.) | 37.3 | f/f5 | −0.05 |
| (V2 + V5)/V1 | 0.92 | (\|f/f5\| + \|f/f6\|)/(f/f4) | 1.39 |
| V5/V6 | 0.541 | CT2/tan(α) (mm) | 0.05 |
| CT5/CT6 | 0.68 | BFL/Td | 0.23 |
| (R1 + R2)/(R1 − R2) | −1.25 | ImgH/f | 0.782 |
| (R9 − R10)/(R9 + R10) | −0.06 | TTL/ImgH | 1.55 |

10th Embodiment

Figure 19:
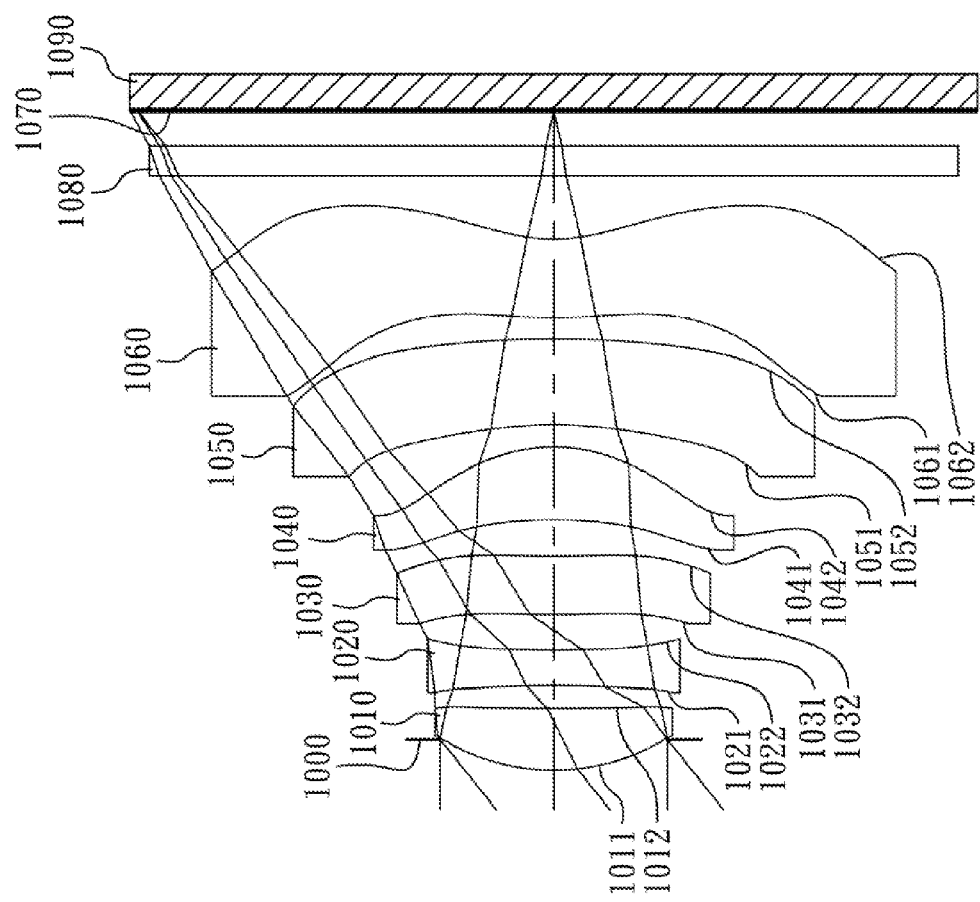
FIG. 19 is a schematic view of an image capturing optical lens system according to the 10th embodiment of the present disclosure.
Figure 20:
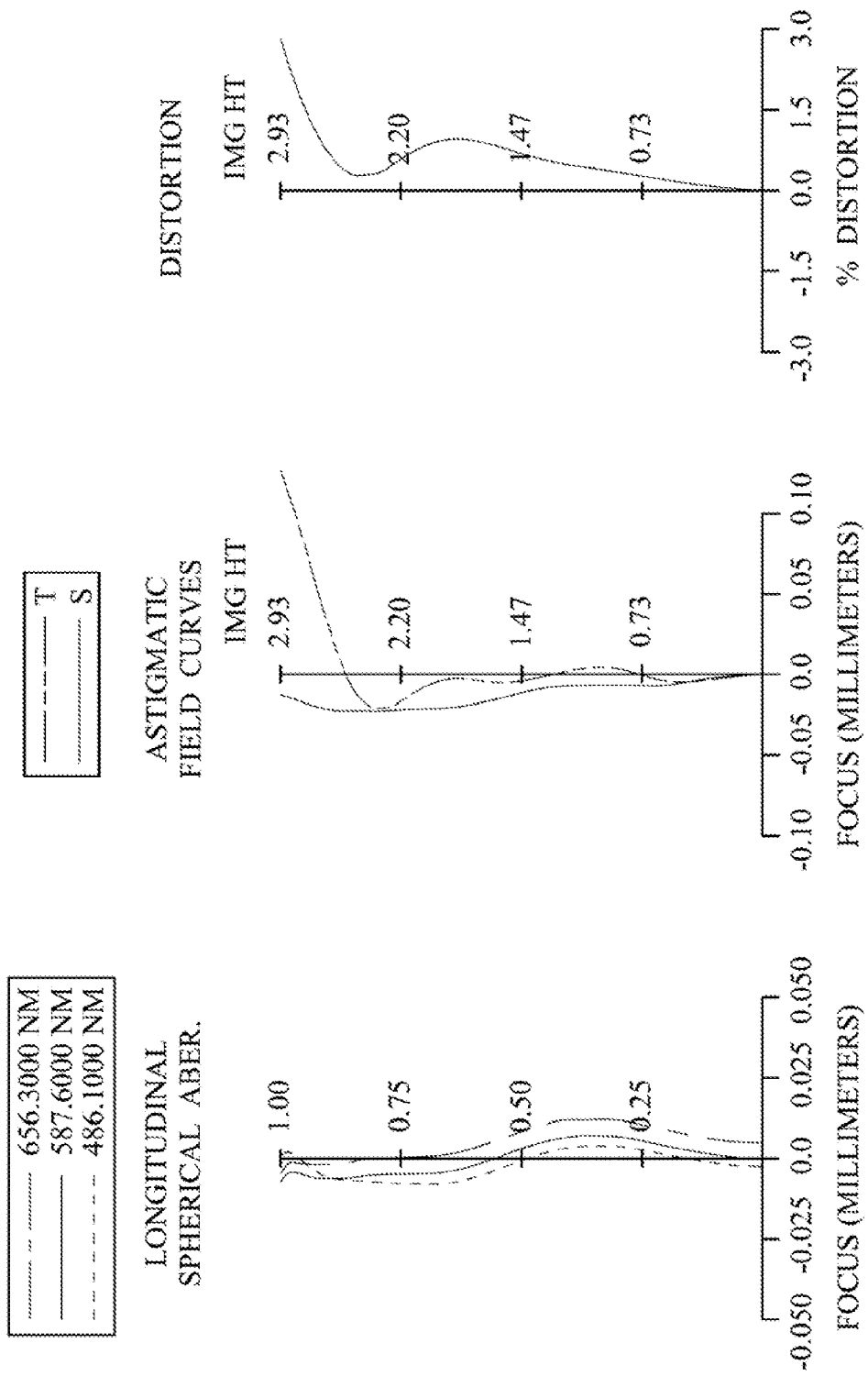
FIG. 20 shows spherical aberration curves, astigmatic field curves and a distortion curve of the image capturing optical lens system according to the 10th embodiment.

FIG. 19 is a schematic view of an image capturing optical lens system according to the 10th embodiment of the present disclosure. FIG. 20 shows spherical aberration curves, astigmatic field curves and a distortion curve of the image capturing optical lens system according to the 10th embodiment. In FIG. 19, the image capturing optical lens system includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1080, an image plane 1070, and an image sensor 1090.

The first lens element 1010 with positive refractive power has an object-side surface 1011 being convex at a paraxial region thereof and an image-side surface 1012 being concave at a paraxial region thereof. The first lens element 1010 is made of plastic material and has the object-side surface 1011 and the image-side surface 1012 being both aspheric.

The second lens element 1020 with negative refractive power has an object-side surface 1021 being concave at a paraxial region thereof and an image-side surface 1022 being concave at a paraxial region thereof. The second lens element 1020 is made of plastic material and has the object-side surface 1021 and the image-side surface 1022 being both aspheric.

The third lens element 1030 with positive refractive power has an object-side surface 1031 being convex at a paraxial region thereof and an image-side surface 1032 being concave at a paraxial region thereof. The third lens element 1030 is made of plastic material and has the object-side surface 1031 and the image-side surface 1032 being both aspheric.

The fourth lens element 1040 with positive refractive power has an object-side surface 1041 being concave at a paraxial region thereof and an image-side surface 1042 being convex at a paraxial region thereof. The fourth lens element 1040 is made of plastic material and has the object-side surface 1041 and the image-side surface 1042 being both aspheric.

The fifth lens element 1050 with negative refractive power has an object-side surface 1051 being concave at a paraxial region thereof and an image-side surface 1052 being convex at a paraxial region thereof. The fifth lens element 1050 is made of plastic material and has the object-side surface 1051 and the image-side surface 1052 being both aspheric.

The sixth lens element 1060 with negative refractive power has an object-side surface 1061 being convex at a paraxial region thereof and an image-side surface 1062 changing from concave at a paraxial region thereof to convex at a peripheral region thereof. The sixth lens element 1060 is made of plastic material and has the object-side surface 1061 and the image-side surface 1062 being both aspheric.

The IR-cut filter 1080 made of glass material is located between the sixth lens element 1060 and the image plane 1070, and will not affect a focal length of the image capturing optical lens system.

The detailed optical data of the 10th embodiment are shown in Table 19, and the aspheric surface data are shown in Table 20 below.

TABLE 19

10th Embodiment
f = 3.59 mm, Fno = 2.25, HFOV = 38.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.217 | | | | |
| 2 | Lens 1 | 1.555 | (ASP) | 0.434 | Plastic | 1.544 | 55.9 | 3.03 |
| 3 | | 25.036 | (ASP) | 0.159 | | | | |
| 4 | Lens 2 | −8.152 | (ASP) | 0.250 | Plastic | 1.650 | 21.4 | −6.15 |
| 5 | | 7.921 | (ASP) | 0.252 | | | | |
| 6 | Lens 3 | 6.513 | (ASP) | 0.408 | Plastic | 1.544 | 55.9 | 43.50 |
| 7 | | 8.787 | (ASP) | 0.259 | | | | |

TABLE 19-continued

10th Embodiment
f = 3.59 mm, Fno = 2.25, HFOV = 38.5 deg.

| Surface # | | Curvature Radius | | Thickness | Material | Index | Abbe # | Focal length |
|---|---|---|---|---|---|---|---|---|
| 8 | Lens 4 | −3.391 | (ASP) | 0.510 | Plastic | 1.544 | 55.9 | 2.87 |
| 9 | | −1.125 | (ASP) | 0.159 | | | | |
| 10 | Lens 5 | −2.520 | (ASP) | 0.601 | Plastic | 1.544 | 55.9 | −7.62 |
| 11 | | −6.969 | (ASP) | 0.150 | | | | |
| 12 | Lens 6 | 2.819 | (ASP) | 0.552 | Plastic | 1.614 | 25.6 | −3.65 |
| 13 | | 1.156 | (ASP) | 0.450 | | | | |
| 14 | IR-cut filter | Plano | | 0.210 | Glass | 1.517 | 64.2 | — |
| 15 | | Plano | | 0.250 | | | | |
| 16 | image | Plano | | — | | | | |

Note:
Reference wavelength (d-line) is 587.6 nm.

TABLE 20

Aspheric Coefficients

| | Surface # | | | | | |
|---|---|---|---|---|---|---|
| | 2 | 3 | 4 | 5 | 6 | 7 |
| k = | −1.1562E−01 | 4.4393E+01 | −9.9274E−01 | −1.6521E+01 | −1.7908E+01 | 9.0788E−01 |
| A4 = | 6.1168E−03 | 3.6207E−03 | −5.2100E−03 | −5.0513E−02 | −2.4346E−01 | −1.4692E−01 |
| A6 = | 4.8562E−02 | 8.4346E−02 | 2.8445E−01 | 4.3775E−01 | 2.4538E−01 | −2.8027E−02 |
| A8 = | 5.7173E−02 | −3.2403E−01 | −1.0170E+00 | −1.0549E+00 | −4.7435E−01 | 3.4510E−02 |
| A10 = | −4.8003E−01 | 6.8018E−01 | 2.1072E+00 | 1.7532E+00 | 6.4246E−01 | −2.2892E−03 |
| A12 = | 9.3889E−01 | −8.8725E−01 | −2.6876E+00 | −1.7284E+00 | −4.8003E−01 | 1.9669E−03 |
| A14 = | −6.4751E−01 | 2.6447E−01 | 1.2659E+00 | 7.3759E−01 | 1.5835E−01 | — |

| | Surface # | | | | | |
|---|---|---|---|---|---|---|
| | 8 | 9 | 10 | 11 | 12 | 13 |
| k = | −2.4468E+00 | −1.0234E+00 | −3.2379E+01 | −8.2036E+01 | −3.7322E+01 | −4.8110E+00 |
| A4 = | −4.3481E−02 | 9.7231E−02 | −2.1372E−02 | −1.2083E−02 | −1.5853E−01 | −1.4110E−01 |
| A6 = | −1.0331E−01 | −1.8397E−01 | −1.7901E−04 | −3.0074E−03 | −1.1837E−02 | 7.7668E−02 |
| A8 = | −8.7354E−03 | 1.2484E−01 | 3.6449E−03 | −1.3178E−03 | 9.9016E−02 | −2.9445E−02 |
| A10 = | 2.5647E−01 | 2.3661E−02 | −2.7268E−03 | 5.0464E−04 | −7.7656E−02 | 7.2684E−03 |
| A12 = | −1.8137E−01 | −2.0200E−02 | −5.4706E−04 | −9.1291E−05 | 2.7743E−02 | −1.2048E−03 |
| A14 = | 3.5075E−02 | 9.3894E−05 | — | — | −4.7398E−03 | 1.2011E−04 |
| A16 = | — | — | — | — | 3.1460E−04 | −5.1835E−06 |

In the image capturing optical lens system according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following relationships:

| f (mm) | 3.59 | R12/f2 | −0.19 |
|---|---|---|---|
| Fno | 2.25 | f/f4 | 1.25 |
| HFOV (deg.) | 38.5 | f/f5 | −0.47 |
| (V2 + V5)/V1 | 1.38 | (|f/f5| + |f/f6|)/(f/f4) | 1.16 |
| V5/V6 | 2.184 | CT2/tan(α) (mm) | 0.07 |
| CT5/CT6 | 1.09 | BFL/Td | 0.23 |
| (R1 + R2)/(R1 − R2) | −1.13 | ImgH/f | 0.816 |
| (R9 − R10)/(R9 + R10) | −0.47 | TTL/ImgH | 1.56 |

11th Embodiment

Figure 21:
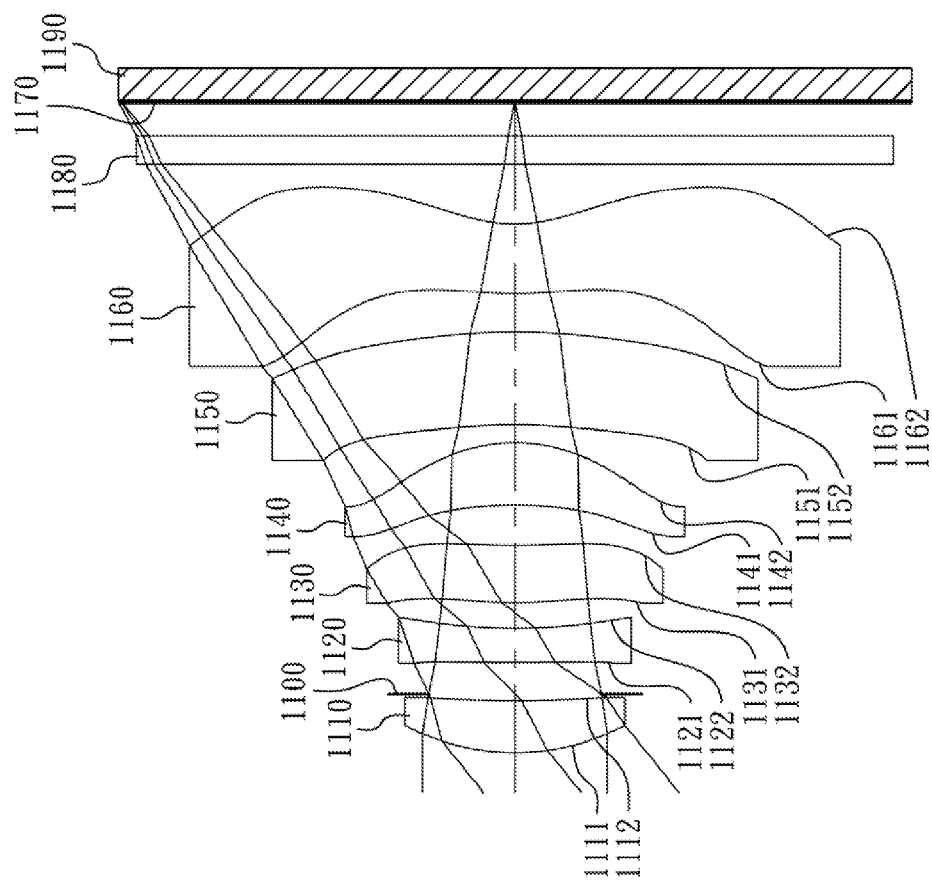
FIG. 21 is a schematic view of an image capturing optical lens system according to the 11th embodiment of the present disclosure.
Figure 22:
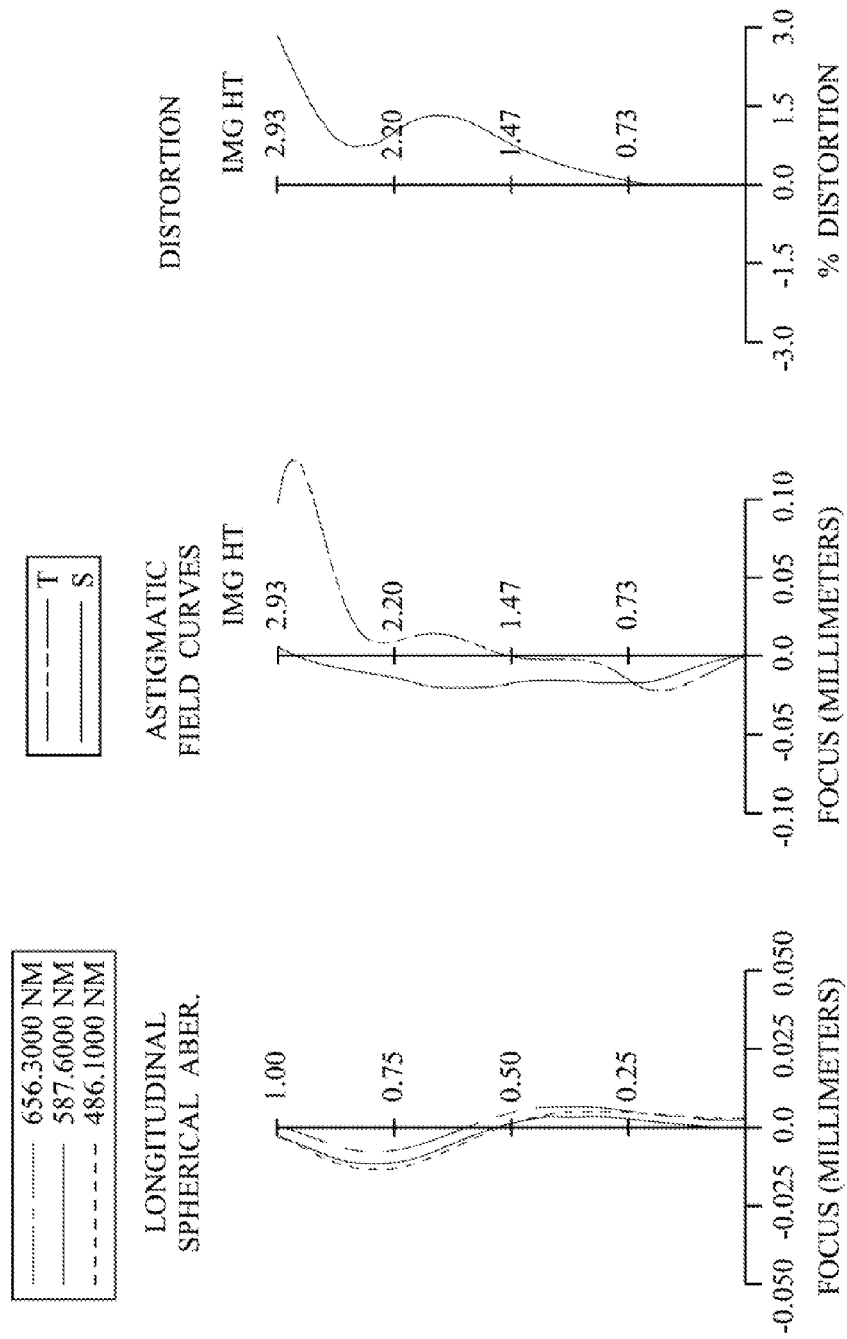
FIG. 22 shows spherical aberration curves, astigmatic field curves and a distortion curve of the image capturing optical lens system according to the 11th embodiment.

FIG. 21 is a schematic view of an image capturing optical lens system according to the 11th embodiment of the present disclosure. FIG. 22 shows spherical aberration curves, astigmatic field curves and a distortion curve of the image capturing optical lens system according to the 11th embodiment. In FIG. 21, the image capturing optical lens system includes, in order from an object side to an image side, a first lens element 1110, an aperture stop 1100, a second lens element 1120, a third lens element 1130, a fourth lens element 1140, a fifth lens element 1150, a sixth lens element 1160, an IR-cut filter 1180, an image plane 1170, and an image sensor 1190.

The first lens element 1110 with positive refractive power has an object-side surface 1111 being convex at a paraxial region thereof and an image-side surface 1112 being concave at a paraxial region thereof. The first lens element 1110 is made of plastic material and has the object-side surface 1111 and the image-side surface 1112 being both aspheric.

The second lens element 1120 with negative refractive power has an object-side surface 1121 being convex at a paraxial region thereof and an image-side surface 1122 being concave at a paraxial region thereof. The second lens element 1120 is made of plastic material and has the object-side surface 1121 and the image-side surface 1122 being both aspheric.

The third lens element 1130 with positive refractive power has an object-side surface 1131 being convex at a paraxial region thereof and an image-side surface 1132 being concave at a paraxial region thereof. The third lens element 1130 is made of plastic material and has the object-side surface 1131 and the image-side surface 1132 being both aspheric.

The fourth lens element 1140 with positive refractive power has an object-side surface 1141 being concave at a paraxial region thereof and an image-side surface 1142 being convex at a paraxial region thereof. The fourth lens element 1140 is made of plastic material and has the object-side surface 1141 and the image-side surface 1142 being both aspheric.

The fifth lens element 1150 with negative refractive power has an object-side surface 1151 being concave at a paraxial region thereof and an image-side surface 1152 being convex at a paraxial region thereof. The fifth lens element 1150 is made of plastic material and has the object-side surface 1151 and the image-side surface 1152 being both aspheric.

The sixth lens element 1160 with negative refractive power has an object-side surface 1161 being convex at a paraxial region thereof and an image-side surface 1162 changing from concave at a paraxial region thereof to convex at a peripheral region thereof. The sixth lens element 1160 is made of plastic material and has the object-side surface 1161 and the image-side surface 1162 being both aspheric.

The IR-cut filter 1180 made of glass material is located between the sixth lens element 1160 and the image plane 1170, and will not affect a focal length of the image capturing optical lens system.

The detailed optical data of the 11th embodiment are shown in Table 21, and the aspheric surface data are shown in Table 22 below.

TABLE 21

11th Embodiment
f = 3.58 mm, Fno = 2.60, HFOV = 38.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.784 | (ASP) | 0.388 | Plastic | 1.535 | 56.3 | 4.02 |
| 2 | | 9.697 | (ASP) | 0.050 | | | | |
| 3 | Ape. Stop | Plano | | 0.235 | | | | |
| 4 | Lens 2 | 34.444 | (ASP) | 0.250 | Plastic | 1.650 | 21.4 | −6.75 |
| 5 | | 3.880 | (ASP) | 0.191 | | | | |
| 6 | Lens 3 | 3.110 | (ASP) | 0.430 | Plastic | 1.535 | 56.3 | 13.56 |
| 7 | | 5.185 | (ASP) | 0.295 | | | | |
| 8 | Lens 4 | −3.224 | (ASP) | 0.470 | Plastic | 1.544 | 55.9 | 3.21 |
| 9 | | −1.191 | (ASP) | 0.131 | | | | |
| 10 | Lens 5 | −3.690 | (ASP) | 0.694 | Plastic | 1.614 | 25.6 | −67.37 |
| 11 | | −4.341 | (ASP) | 0.283 | | | | |
| 12 | Lens 6 | 2.689 | (ASP) | 0.517 | Plastic | 1.614 | 25.6 | −3.02 |
| 13 | | 1.018 | (ASP) | 0.450 | | | | |
| 14 | IR-cut filter | Plano | | 0.210 | Glass | 1.517 | 64.2 | — |
| 15 | | Plano | | 0.257 | | | | |
| 16 | Image | Plano | | — | | | | |

Note:
Reference wavelength (d-line) is 587.6 nm.

TABLE 22

Aspheric Coefficients

| | Surface # | | | | | |
|---|---|---|---|---|---|---|
| | 1 | 2 | 4 | 5 | 6 | 7 |
| k = | −7.6470E−02 | 3.1937E+01 | −5.0000E+01 | −2.5519E+01 | −1.2297E+01 | −1.9347E+01 |
| A4 = | 7.1731E−03 | 1.2153E−02 | −2.3455E−02 | −5.4475E−02 | −2.3603E−01 | −1.5498E−01 |
| A6 = | 4.4148E−02 | 6.8468E−02 | 2.4633E−01 | 4.1900E−01 | 2.5919E−01 | −4.0139E−02 |
| A8 = | 5.9718E−02 | −3.9910E−01 | −1.0863E+00 | −1.0778E+00 | −4.6874E−01 | 2.2970E−02 |
| A10 = | −5.2513E−01 | 7.2459E−01 | 2.1056E+00 | 1.7171E+00 | 6.1983E−01 | −9.1050E−03 |
| A12 = | 9.3889E−01 | −8.8725E−01 | −2.6876E+00 | −1.7284E+00 | −4.8001E−01 | −2.9391E−04 |
| A14 = | −6.4751E−01 | 2.6447E−01 | 1.2659E+00 | 7.3759E−01 | 1.5835E−01 | — |
| A16 = | — | — | — | — | — | — |

| | Surface # | | | | | |
|---|---|---|---|---|---|---|
| | 8 | 9 | 10 | 11 | 12 | 13 |
| k = | −1.4331E+00 | −1.0000E+00 | −8.3901E+01 | −2.6945E+01 | −3.4415E+01 | −4.3565E+00 |
| A4 = | −4.5095E−02 | 8.0598E−02 | −1.6846E−03 | 6.7393E−03 | −1.6535E−01 | −1.4409E−01 |
| A6 = | −9.9740E−02 | −1.8572E−01 | −3.6514E−03 | −6.8024E−03 | −1.3688E−02 | 7.9199E−02 |
| A8 = | −1.0537E−01 | 1.2581E−01 | 5.1537E−04 | −1.7253E−03 | 9.9446E−02 | −2.9673E−02 |
| A10 = | 2.5445E−01 | 2.4461E−02 | −4.5088E−03 | 8.2334E−04 | −7.7462E−02 | 7.2665E−03 |
| A12 = | −1.8191E−01 | −1.9951E−02 | 5.8669E−04 | −5.6815E−05 | 2.7782E−02 | −1.2029E−03 |
| A14 = | 3.6895E−02 | −6.4052E−05 | — | — | −4.7393E−03 | 1.2052E−04 |
| A16 = | — | — | — | — | 3.1108E−04 | −5.2565E−06 |

In the image capturing optical lens system according to the 11th embodiment, the definitions of these parameters shown in the following table are the same as those stated in the 1st embodiment with corresponding values for the 11th embodiment. Moreover, these parameters can be calculated from Table 21 and Table 22 as the following values and satisfy the following relationships:

| f (mm) | 3.53 | R12/f2 | −0.15 |
|---|---|---|---|
| Fno | 2.60 | f/f4 | 1.11 |
| HFOV (deg.) | 38.6 | f/f5 | −0.05 |
| (V2 + V5)/V1 | 0.83 | (|f/f5| + |f/f6|)/(f/f4) | 1.11 |
| V5/V6 | 1.000 | CT2/tan(α) (mm) | 0.08 |
| CT5/CT6 | 1.34 | BFL/Td | 0.22 |
| (R1 + R2)/(R1 − R2) | −1.45 | ImgH/f | 0.820 |
| (R9 − R10)/(R9 + R10) | −0.08 | TTL/ImgH | 1.63 |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

The invention claimed is:

1. An image capturing optical lens system comprising, in order from an object side to an image side:
    a first lens element with positive refractive power having an object-side surface being convex at a paraxial region thereof;
    a second lens element having negative refractive power;
    a third lens element with refractive power having an image-side surface being concave at a paraxial region thereof;
    a fourth lens element having refractive power, wherein at least one of an object-side surface and an image-side surface of the fourth lens element is aspheric;
    a fifth lens element with negative refractive power having an object-side surface being concave at a paraxial region thereof and an image-side surface being convex at a paraxial region thereof, wherein the object-side surface and the image-side surface of the fifth lens element are aspheric; and
    a sixth lens element with refractive power having an object-side surface being convex at a paraxial region thereof and an image-side surface, wherein the image-side surface of the sixth lens element changes from concave at a paraxial region thereof to convex at a peripheral region thereof, and the object-side surface and the image-side surface of the sixth lens element are aspheric;
    wherein of the first lens element, the second lens element, the third lens element, the fourth lens element, the fifth lens element and the sixth lens element of the image capturing optical lens system, there is a space in a paraxial region between every pair of lens elements that are adjacent to each other, a curvature radius of the object-side surface of the first lens element is R1, a curvature radius of an image-side surface of the first lens element is R2, and the following relationship is satisfied:

$-3.0<(R1+R2)/(R1-R2)<0.$

2. The image capturing optical lens system of claim 1, wherein the fourth lens element with positive refractive power has an image-side surface being convex at a paraxial region thereof.

3. The image capturing optical lens system of claim 2, wherein the second lens element has an image-side surface being concave at a paraxial region thereof.

4. The image capturing optical lens system of claim 2, wherein a maximum image height of the image capturing optical lens system is ImgH, a focal length of the image capturing optical lens system is f, and the following relationship is satisfied:

$0.72<ImgH/f<1.0.$

5. The image capturing optical lens system of claim 2, wherein a focal length of the image capturing optical lens system is f, a focal length of the fourth lens element is f4, a focal length of the fifth lens element is f5, a focal length of the sixth lens element is f6, and the following relationship is satisfied:

$0.3<(|f/f5|+|f/f6|)/(f/f4)<1.5.$

6. The image capturing optical lens system of claim 2, wherein a maximum image height of the image capturing optical lens system is ImgH, an axial distance between the object-side surface of the first lens element and an image plane is TTL, and the following relationship is satisfied:

$TTL/ImgH<1.8.$

7. The image capturing optical lens system of claim 1, wherein the image-side surface of the first lens element is concave at a paraxial region thereof.

8. The image capturing optical lens system of claim 1, wherein the second lens element has an object-side surface being convex at a paraxial region thereof.

9. The image capturing optical lens system of claim 1, wherein a curvature radius of the object-side surface of the fifth lens element is R9, a curvature radius of the image-side surface of the fifth lens element is R10, and the following relationship is satisfied:

$-0.50<(R9-R10)/(R9+R10)<0.$

10. The image capturing optical lens system of claim 1, wherein an Abbe number of the fifth lens element is V5, an Abbe number of the sixth lens element is V6, and the following relationship is satisfied:

$0.20<V5/V6<0.70.$

11. The image capturing optical lens system of claim 1, wherein a focal length of the image capturing optical lens system is f, a focal length of the fifth lens element is f5, and the following relationship is satisfied:

$-1.20<f/f5<-0.20.$

12. The image capturing optical lens system of claim 1, wherein a central thickness of the fifth lens element is CT5, a central thickness of the sixth lens element is CT6, and the following relationship is satisfied:

$0.10<CT5/CT6<0.50.$

13. The image capturing optical lens system of claim 1, wherein a focal length of the image capturing optical lens system is f, a focal length of the fourth lens element is f4, and the following relationship is satisfied:

$0.6<f/f4<1.8.$

14. The image capturing optical lens system of claim 1, wherein a curvature radius of the image-side surface of the sixth lens element is R12, a focal length of the second lens element is f2, and the following relationship is satisfied:

$-1.0<R12/f2<0.$

15. The image capturing optical lens system of claim 1, wherein an Abbe number of the first lens element is V1, an Abbe number of the second lens element is V2, an Abbe number of the fifth lens element is V5, and the following relationship is satisfied:

$$0.6<(V2+V5)/V1<1.0.$$

16. The image capturing optical lens system of claim 1, wherein a central thickness of the second lens element is CT2, an angle between a tangent of an inflection point on the image-side surface of the sixth lens element and an optical axis is α, and the following relationship is satisfied:

$$0 \text{ mm}<CT2/\tan(\alpha)<0.30 \text{ mm}.$$

17. An image capturing optical lens system comprising, in order from an object side to an image side:
    a first lens element with positive refractive power having an object-side surface being convex at a paraxial region thereof;
    a second lens element with refractive power;
    a third lens element with refractive power;
    a fourth lens element with refractive power, wherein at least one of an object-side surface and an image-side surface of the fourth lens element is aspheric;
    a fifth lens element with negative refractive power having an object-side surface being concave at a paraxial region thereof and an image-side surface being convex at a paraxial region thereof, wherein the object-side surface and the image-side surface of the fifth lens element are aspheric; and
    a sixth lens element with refractive power having an object-side surface being convex at a paraxial region thereof and an image-side surface, wherein the image-side surface of the sixth lens element being concave at a paraxial region thereof and convex at a peripheral region thereof, and the object-side surface and the image-side surface of the sixth lens element are aspheric;
    wherein of the first lens element, the second lens element, the third lens element, the fourth lens element, the fifth lens element and the sixth lens element of the image capturing optical lens system, there is a space in a paraxial region between every pair of lens elements that are adjacent to each other, a curvature radius of the object-side surface of the first lens element is R1, a curvature radius of an image-side surface of the first lens element is R2, a maximum image height of the image capturing optical lens system is ImgH, a focal length of the image capturing optical lens system is f, and the following relationships are satisfied:

$$-3.0<(R1+R2)/(R1-R2)<0;$$

and $$0.72<ImgH/f<1.0.$$

18. The image capturing optical lens system of claim 17, further comprising:
    a stop located between an object and the third lens element.

19. The image capturing optical lens system of claim 18, wherein the image-side surface of the first lens element is concave at a paraxial region thereof.

20. The image capturing optical lens system of claim 19, wherein the second lens element has an object-side surface being convex at a paraxial region thereof.

21. The image capturing optical lens system of claim 18, wherein the third lens element has an image-side surface being concave at a paraxial region thereof.

22. The image capturing optical lens system of claim 18, wherein the image-side surface of the fourth lens element is convex at a paraxial region thereof.

23. The image capturing optical lens system of claim 18, wherein the second lens element has negative refractive power.

24. The image capturing optical lens system of claim 18, wherein the fourth lens element has positive refractive power.

25. The image capturing optical lens system of claim 18, wherein the focal length of the image capturing optical lens system is f, a focal length of the fifth lens element is f5, and the following relationship is satisfied:

$$-1.20<f/f5<-0.20.$$

26. The image capturing optical lens system of claim 18, wherein a curvature radius of the object-side surface of the fifth lens element is R9, a curvature radius of the image-side surface of the fifth lens element is R10, and the following relationship is satisfied:

$$-0.50<(R9-R10)/(R9+R10)<0.$$

27. The image capturing optical lens system of claim 18, wherein the focal length of the image capturing optical lens system is f, and the following relationship is satisfied:

$$3.75 \text{ mm} \leq f.$$

28. The image capturing optical lens system of claim 17, wherein an Abbe number of the fifth lens element is V5, an Abbe number of the sixth lens element is V6, and the following relationship is satisfied:

$$0.20<V5/V6<0.70.$$

29. The image capturing optical lens system of claim 17, wherein the focal length of the image capturing optical lens system is f, a focal length of the fourth lens element is f4, a focal length of the fifth lens element is f5, a focal length of the sixth lens element is f6, and the following relationship is satisfied:

$$0.3<(|f/f5|+|f/f6|)/(f/f4)<1.5.$$

30. The image capturing optical lens system of claim 17, wherein the maximum image height of the image capturing optical lens system is ImgH, an axial distance between the object-side surface of the first lens element and an image plane is TTL, and the following relationship is satisfied:

$$TTL/ImgH<1.8.$$

31. The image capturing optical lens system of claim 17, wherein an axial distance between the image-side surface of the sixth lens element and an image plane is BFL, an axial distance between the object-side surface of the first lens element and the image-side surface of the sixth lens element is Td, and the following relationship is satisfied:

$$0.15<BFL/Td<0.40.$$

32. The image capturing optical lens system of claim 17, wherein an axial distance between the fourth lens element and the fifth lens element is T45, an axial distance between the fifth lens element and the sixth lens element is T56, and the following relationship is satisfied:

$$T56<T45.$$

33. The image capturing optical lens system of claim 17, wherein an axial distance between the second lens element and the third lens element is T23, an axial distance between the third lens element and the fourth lens element is T34, and the following relationship is satisfied:

$$T34<T23.$$

* * * * *

UNITED STATES PATENT AND TRADEMARK OFFICE
CERTIFICATE OF CORRECTION

PATENT NO. : 8,934,178 B2  Page 1 of 1
APPLICATION NO. : 13/709073
DATED : January 13, 2015
INVENTOR(S) : Hsiang-Chi Tang et al.

It is certified that error appears in the above-identified patent and that said Letters Patent is hereby corrected as shown below:

In the Claims (1) In column 41, line 10, Claim 16 of the issued patent reads as "axis is a, and the following relationship is satisfied:", but it should read as "axis is α, and the following relationship is satisfied:".

Signed and Sealed this
Twelfth Day of May, 2015

Michelle K. Lee
*Director of the United States Patent and Trademark Office*